United States Patent
Ishigami et al.

(10) Patent No.: US 7,987,047 B2
(45) Date of Patent: Jul. 26, 2011

(54) NAVIGATION EQUIPMENT

(75) Inventors: Tadatomi Ishigami, Tokyo (JP); Masatoshi Fujii, Tokyo (JP); Keika Kan, Tokyo (JP); Sadami Ouchi, Tokyo (JP); Hiroaki Kato, Tokyo (JP); Takeshi Nita, Tokyo (JP); Atsushi Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/672,240

(22) PCT Filed: Jul. 7, 2008

(86) PCT No.: PCT/JP2008/001805
§ 371 (c)(1), (2), (4) Date: Feb. 4, 2010

(87) PCT Pub. No.: WO2009/034671
PCT Pub. Date: Mar. 19, 2009

(65) Prior Publication Data
US 2011/0071755 A1   Mar. 24, 2011

(30) Foreign Application Priority Data
Sep. 10, 2007 (JP) ................................ 2007-234367

(51) Int. Cl.
*G01C 21/30* (2006.01)
*G01C 21/00* (2006.01)

(52) U.S. Cl. ........ 701/200; 701/208; 701/213; 701/214; 701/216

(58) Field of Classification Search .................. None
See application file for complete search history.

(56) References Cited

U.S. PATENT DOCUMENTS

| | | | | |
|---|---|---|---|---|
| 5,438,517 A | * | 8/1995 | Sennott et al. | 701/213 |
| 5,442,558 A | * | 8/1995 | Kyrtsos et al. | 701/215 |
| 5,552,794 A | * | 9/1996 | Colley et al. | 342/357.25 |
| 7,158,883 B2 | * | 1/2007 | Fuchs et al. | 701/213 |
| 7,463,189 B2 | * | 12/2008 | Bryant et al. | 342/357.64 |
| 7,705,775 B2 | * | 4/2010 | Madhavan et al. | 342/357.31 |
| 2010/0169006 A1 | * | 7/2010 | Ueda et al. | 701/208 |

FOREIGN PATENT DOCUMENTS

| | | |
|---|---|---|
| DE | 197 05 740 B4 | 8/1997 |
| EP | 1 218 694 B1 | 11/2006 |
| JP | 10-47983 A | 2/1998 |
| JP | 2001-124840 A | 5/2001 |
| JP | 2001-272239 A | 10/2001 |
| JP | 2002-213979 A | 7/2002 |

(Continued)

*Primary Examiner* — Khoi Tran
*Assistant Examiner* — Bao Long Nguyen
(74) *Attorney, Agent, or Firm* — Birch, Stewart, Kolasch & Birch, LLP

(57) ABSTRACT

A navigation equipment includes a user position observing unit 15 for calculating the position of the navigation equipment by using the pseudo range and position of each GPS satellite, and a pseudo range error, a user velocity and heading observing unit 16 for calculating the velocity of the navigation equipment from a measured range rate, the position of each GPS satellite, and the position of the navigation equipment, and a user heading searching unit 17 for, when a multipath error is smaller than a specified value, searching for, as the heading of the navigation equipment, a heading whose range rate, which is calculated from a relative movement between the navigation equipment when the navigation equipment changes its heading within a predetermined angle range and a GPS satellite, matches the measured range rate.

18 Claims, 17 Drawing Sheets

FOREIGN PATENT DOCUMENTS

| | | |
|---|---|---|
| JP | 3745165 B2 | 2/2006 |
| JP | 2006-322846 A | 11/2006 |
| JP | 2007-10550 A | 1/2007 |
| WO | WO-2005/017552 A1 | 2/2005 |

* cited by examiner

FIG. 3
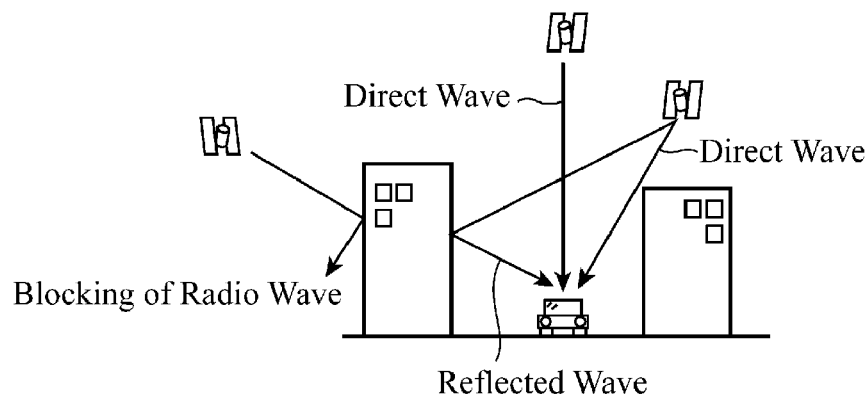
FIG. 4
(a)
(b)

— Measurement Value
······ Estimated Value (Moving)
— Estimated Value (Stationary)

Range Rate [m/s]

Time [s]

Range Rate [m/s]

Time [s]

NAVIGATION EQUIPMENT

FIELD OF THE INVENTION

The present invention relates to navigation equipment that performs positioning and map matching using a GPS (Global Positioning System) receiver and a dead reckoning sensor.

BACKGROUND OF THE INVENTION

Navigation equipment mounted in a vehicle carries out display of the vehicle's position on a road shown in a map, guidance, etc. When displaying the vehicle's position on an on-screen road, the navigation equipment measures the movement of the vehicle by using the GPS and an dead reckoning sensor including a velocity sensor and an angular velocity sensor, and performs a map matching process so as to determine the position of the vehicle on a road link shown by map data. However, the dead reckoning sensor has a rate (referred to as a "Scale Factor") with which the dead reckoning sensor converts pulses outputted from the velocity sensor into a distance and the rate differs for every vehicle. Furthermore, because the bias voltage (referred to as the "offset") of the angular velocity sensor drifts according to temperature, it is necessary to always check occurrence of an error and to correct this error properly.

In addition, the GPS has problems when used as follows.

(1) The GPS positioning requires radio waves from three or more GPS satellites in principle. However, when the field of vision over the vehicle becomes narrowed because of buildings or the like around the road along which the vehicle is traveling, the radio wave from one or more GPS satellites is blocked. When the number of GPS satellites which can be used for the positioning becomes smaller than three due to this blocking, the navigation equipment cannot carry out the positioning and the availability of the navigation equipment is reduced. Hereafter, this problem is referred to as an "availability problem".

(2) When a building or the like exists around the road along which the vehicle is traveling, the radio wave from a GPS satellite is reflected by the building or the like and propagates through a plurality of paths (a multipath) until the radio wave from the GPS satellite reaches the GPS receiver on the ground, and therefore the propagation delay time of the radio wave becomes long. In the GPS positioning, because the vehicle's position is measured from a pseudo range which is acquired by converting the propagation delay time into a distance, the occurrence of multipath propagation provides a large error for the vehicle's position. Hereafter, this problem is called a "multipath problem".

As mentioned above, a problem with the case of carrying out the GPS positioning in an urban area is that the availability is reduced, and multipath propagation occurs and this results in a large error occurring in the vehicle's position. In a conventional navigation equipment, in order to eliminate this problem resulting from the GPS positioning, correction of the vehicle's position on a road link by using measurement data acquired from a dead reckoning sensor is carried out.

As such a technology, patent reference 1 discloses a GPS receiver which uses a Kalman filter in order to improve the accuracy of positioning computation results, and a car navigation system. The GPS receiver and the car navigation system disclosed by this patent reference 1 are constructed in such a way as to return the results of map matching to the Kalman filter in order to guide the convergence of the Kalman filter used for the GPS positioning arithmetic operation toward a correct direction. This is based on that the results of carrying out map matching using measurement data acquired from a dead reckoning sensor is more accurate than that provided by the results of carrying out map matching using GPS positioning data.

Furthermore, patent reference 2 discloses a GPS receiver with a DR (Dead Reckoning) function. The GPS receiver disclosed by this patent reference 2 is constructed in such a way as to, for example, feed the results of map matching carried out by navigation equipment back to the GPS receiver itself so as to cancel a positioning error. The GPS receiver with a DR function performs DR positioning and GPS positioning independently, but does not complexly carry out positioning by using a Kalman filter or the like.

Furthermore, patent reference 3 discloses a GPS receiver that reduces a pseudo range error without causing a reduction in the availability, thereby being able to improve the positioning accuracy. The GPS receiver disclosed by this patent reference 3 is constructed in such a way as to smooth the pseudo range (measured from the propagation delay time) which is easy to be affected by the influence of multipath propagation by using a range rate (measured from a Doppler shift of the carrier frequency) which cannot be easily affected by the influence of multipath propagation. Even in a case in which instantaneous interception of the radio wave from a GPS satellite occurs, the GPS receiver interpolates the pseudo range by using the range rate estimated from a relative movement between the GPS satellite and the vehicle, and uses the pseudo range for positioning calculation. Thereby, the GPS receiver resolves the multipath problem and the availability problem.

[Patent reference 1] JP, 2001-272239,A
[Patent reference 2] JP, 2002-213979,A
[Patent reference 3] JP, 2006-322846,A By the way, navigation equipment that performs positioning and map matching by using a GPS receiver and a dead reckoning sensor has to satisfy the following minimum requirements: being able to receive radio waves from three or more GPS satellites existing over the vehicle, and the GPS receiver being able to carry out either two-dimensional positioning or three-dimensional positioning, in order to use the results of GPS positioning.

However, when the vehicle is traveling along a road in an urban area or the like where buildings or the like extends along the road, the field of vision over the vehicle becomes narrowed because of the buildings or the like and, if the number of GPS satellites from which the GPS receiver can receive radio waves becomes smaller than three, there arises an availability problem that the availability of the GPS decreases. Furthermore, there arises a multipath problem that the GPS receiver often receives radio waves reflected by buildings or the like at such a location and easily produces GPS positioning results having a large error. To solve this problem, a conventional navigation equipment is constructed in such a way as to be able to determine (dead reckoning) the position of the vehicle by using the travelled distance and turning angle of the vehicle (user) which are measured by a dead reckoning sensor so as to correct the position of the vehicle on a road link or the like.

However, in a case in which the vehicle starts traveling from a place outside roads, such as a multi-level car parking tower, large errors occurring in the position and heading of the vehicle which are determined through dead reckoning cause a mismatch of the position of the vehicle onto an incorrect road link at a time when the vehicle travels along a road after that. In this case, when the navigation equipment is in a state in which it cannot carry out GPS positioning, the mismatching continues. When the current position of the vehicle is not correct, the navigation equipment makes a mistake in the route guidance etc.

To solve these problems, in accordance with the technology disclosed by patent reference 1, the results of carrying out map matching by using measurement data acquired from the dead reckoning sensor are fed back to the Kalman filter on the basis of the premise that its accuracy is higher than that provided by the results of carrying out map matching by using GPS positioning data so as to guide the direction of the convergence of the Kalman filter which is used for the GPS positioning arithmetic operations. However, as mentioned above, when the results of carrying out map matching are not correct, a disadvantage is that the results of mismatching obstruct normal GPS positioning, and therefore the identification of the position of the vehicle on a correct road link is hindered.

Furthermore, to solve the above-mentioned problems, in accordance with the technology disclosed by patent reference 2, attempt is made to remove errors in dead reckoning by using the results of map matching. However, this technology is effective when the map matching can be carried out correctly, like the technology disclosed by above-mentioned patent reference 1, though in a state in which a mismatch occurs before the GPS positioning is carried out, desired advantages cannot be provided, as mentioned above.

In addition, to solve the above-mentioned problems, in accordance with the technology disclosed by patent reference 3, the pseudo range which is easy to be affected by the influence of multipath propagation is smoothed by using the range rate which cannot be easily affected by the influence of multipath propagation so as to reduce the influence of multipath propagation. Furthermore, when instantaneous interception of the radio wave from a GPS satellite occurs, the GPS receiver interpolates the pseudo range by using the range rate estimated from a relative movement between the GPS satellite and the vehicle, and uses the pseudo range for the positioning calculation. Thereby, the reduction in the availability and the influence of multipath propagation can be reduced. However, when the number of radio waves from GPS satellites which can be used for the positioning after the navigation equipment is powered on is smaller than three, because even this technology does not make it possible to carry out the GPS positioning, the desired advantages cannot be provided.

The present invention is made in order to solve the above-mentioned problems, and it is therefore an object of the present invention to provide navigation equipment that can reduce the influence of multipath propagation without causing any reduction in the availability thereof, thereby being able to improve the positioning accuracy.

DISCLOSURE OF THE INVENTION

In order to solve the above-mentioned problems, in accordance with the present invention, there is provided navigation equipment including: a radio wave receiving unit for receiving radio waves emitted from a plurality of GPS satellites; a signal processing unit for identifying the GPS satellites which are emission sources of the radio waves received by the radio wave receiving unit to measure a pseudo range and a range rate of each of these identified GPS satellites, and for extracting a navigation message included in each of the radio waves; a GPS satellite behavior estimating unit for calculating a position and a velocity of each of the GPS satellites from the navigation message extracted by the signal processing unit; a pseudo range error estimating unit for estimating a pseudo range error on a basis of the pseudo range and the range rate which are measured by the signal processing unit; a user position observing unit for calculating a position of the navigation equipment by using the pseudo range measured by the signal processing unit, the position of each of the GPS satellites calculated by the GPS satellite behavior estimating unit, and the pseudo range error estimated by the pseudo range error estimating unit; a user velocity and heading observing unit for calculating a velocity of the navigation equipment from the range rate measured by the signal processing unit, the position of each of the GPS satellites calculated by the GPS satellite behavior estimating unit, and the position of the navigation equipment calculated by the user position observing unit; and a user heading searching unit for, when a multipath error included in the pseudo range error estimated by the pseudo range error estimating unit is smaller than a specified value, searching for, as a heading of the navigation equipment, a heading whose range rate, which is calculated on a basis of a relative movement of the navigation equipment having the position acquired by the user position observing unit and the velocity acquired by the user velocity and heading observing unit at a time when the navigation equipment changes its heading within a predetermined angle range with respect to a GPS satellite having the position and the velocity estimated by the GPS satellite behavior estimating unit, matches the range rate measured by the signal processing unit.

The navigation equipment in accordance with the present invention can judge whether or not each of the GPS satellite radio waves received thereby is under the influence of multipath propagation and can also detect the heading of the vehicle if the navigation equipment can receive one GPS satellite radio wave which is not affected by the influence of multipath propagation even in a case in which the navigation equipment cannot carry out GPS positioning because the number of GPS satellites which can be used for positioning is one or two. As a result, the navigation equipment can reduce the influence of multipath propagation without causing any reduction in its availability, and can improve the positioning accuracy.

BRIEF DESCRIPTION OF THE FIGURES

FIG. 3 is a view for explaining a receiving state of receiving GPS satellite radio waves when a vehicle equipped with the navigation equipment in accordance with Embodiment 1 of the present invention is traveling along a road in an urban area;

FIG. 4 is a figure showing an example of transition of the heading and velocity of the vehicle acquired through GPS positioning in the navigation equipment in accordance with Embodiment 1 of the present invention;

Figure 7:
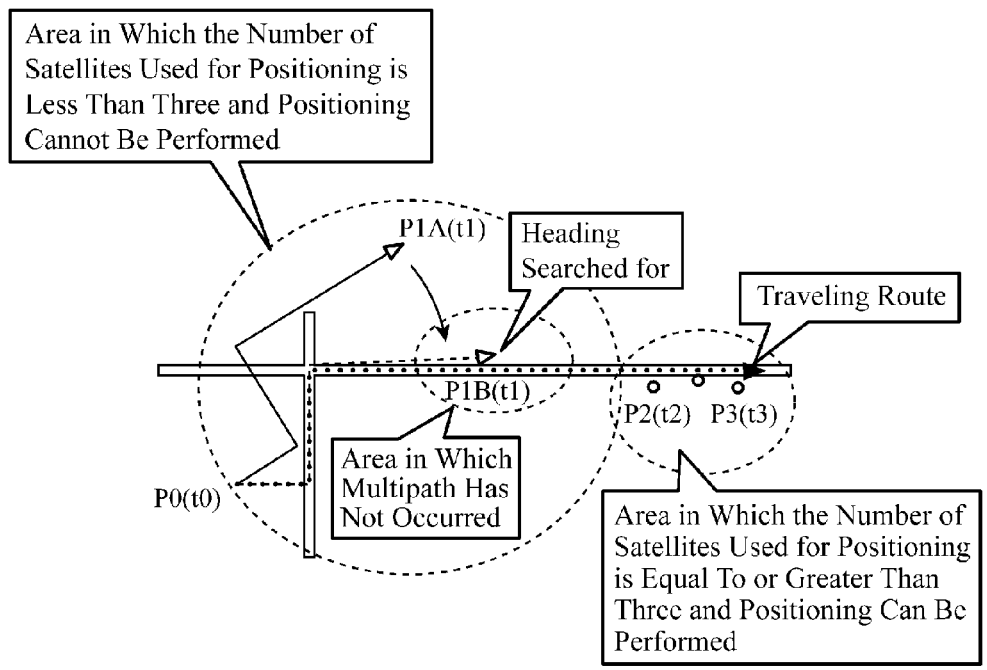
Figure 8:
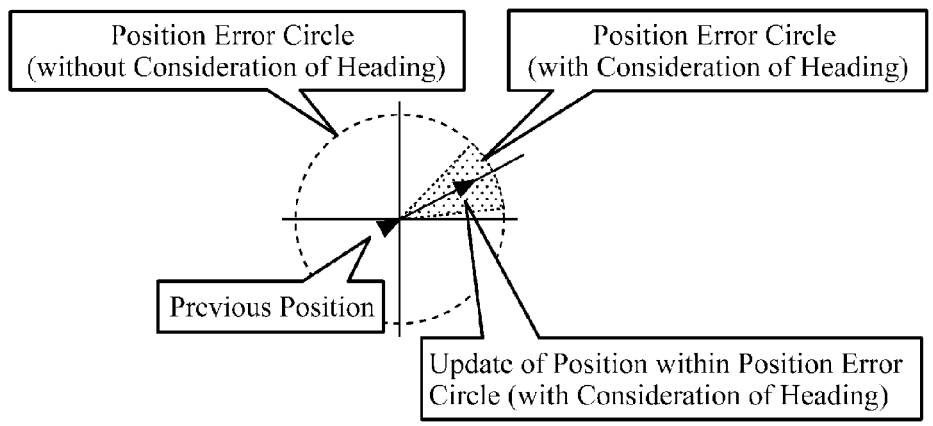
Figure 9:
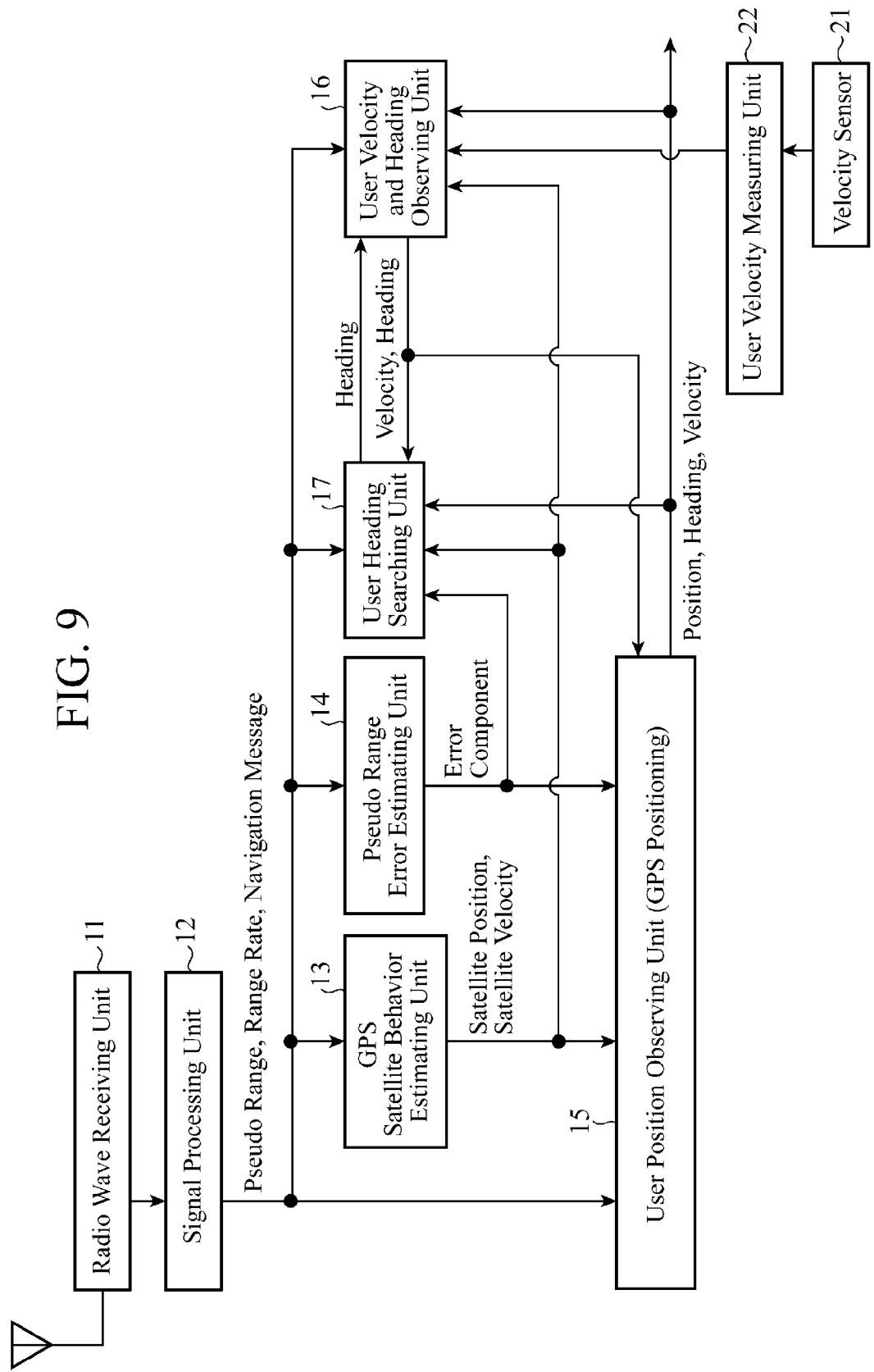
Figure 10:
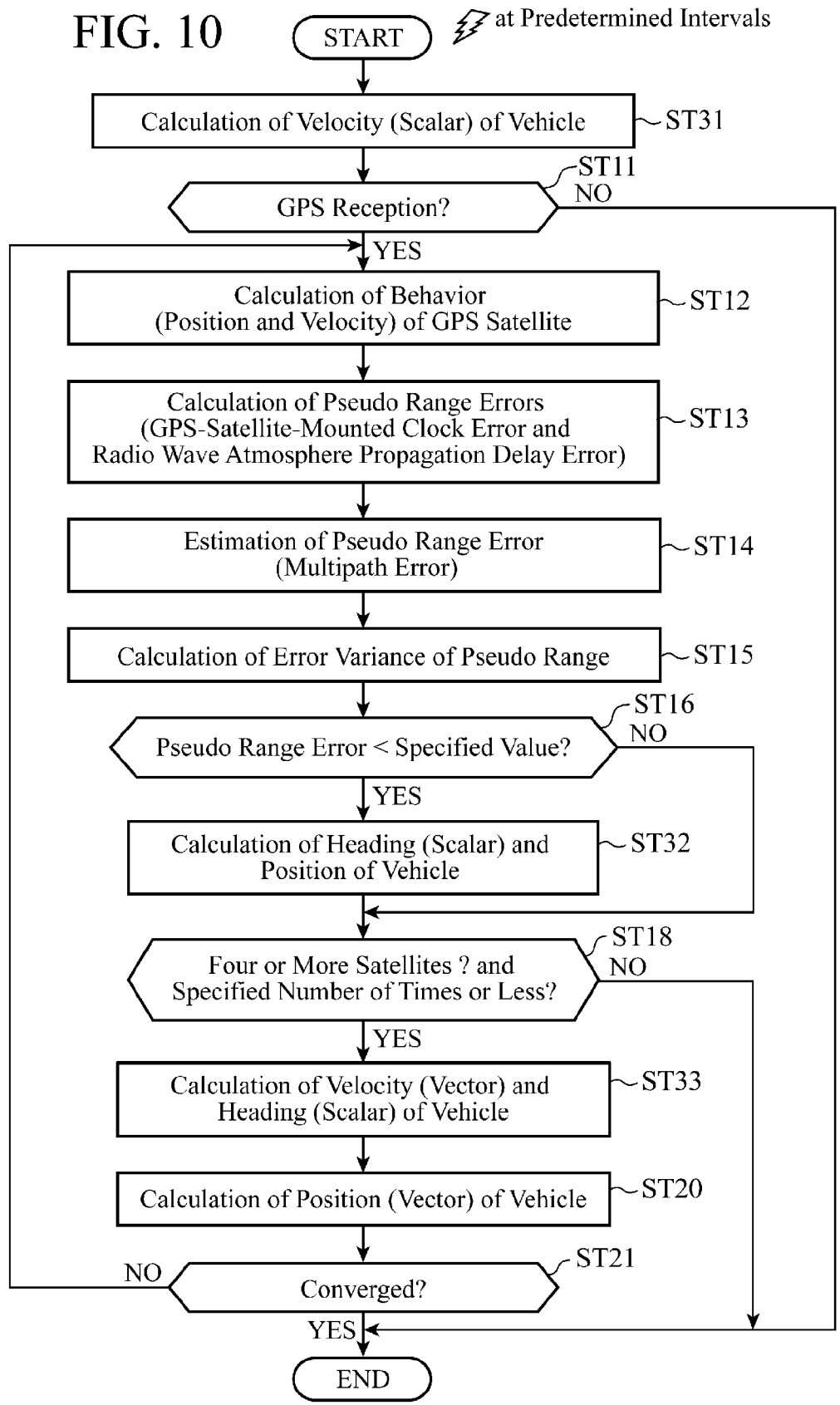
Figure 11:
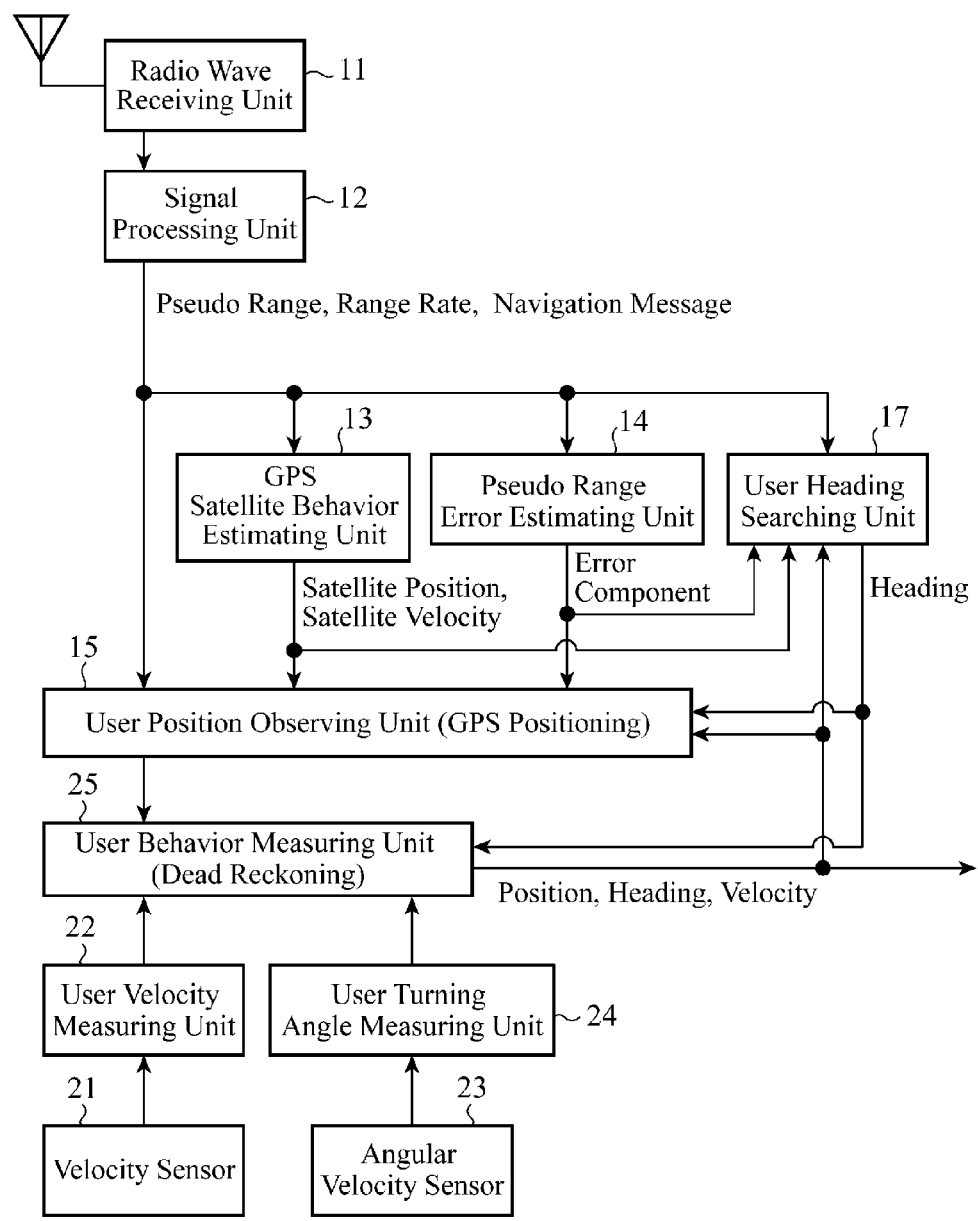
Figure 12:
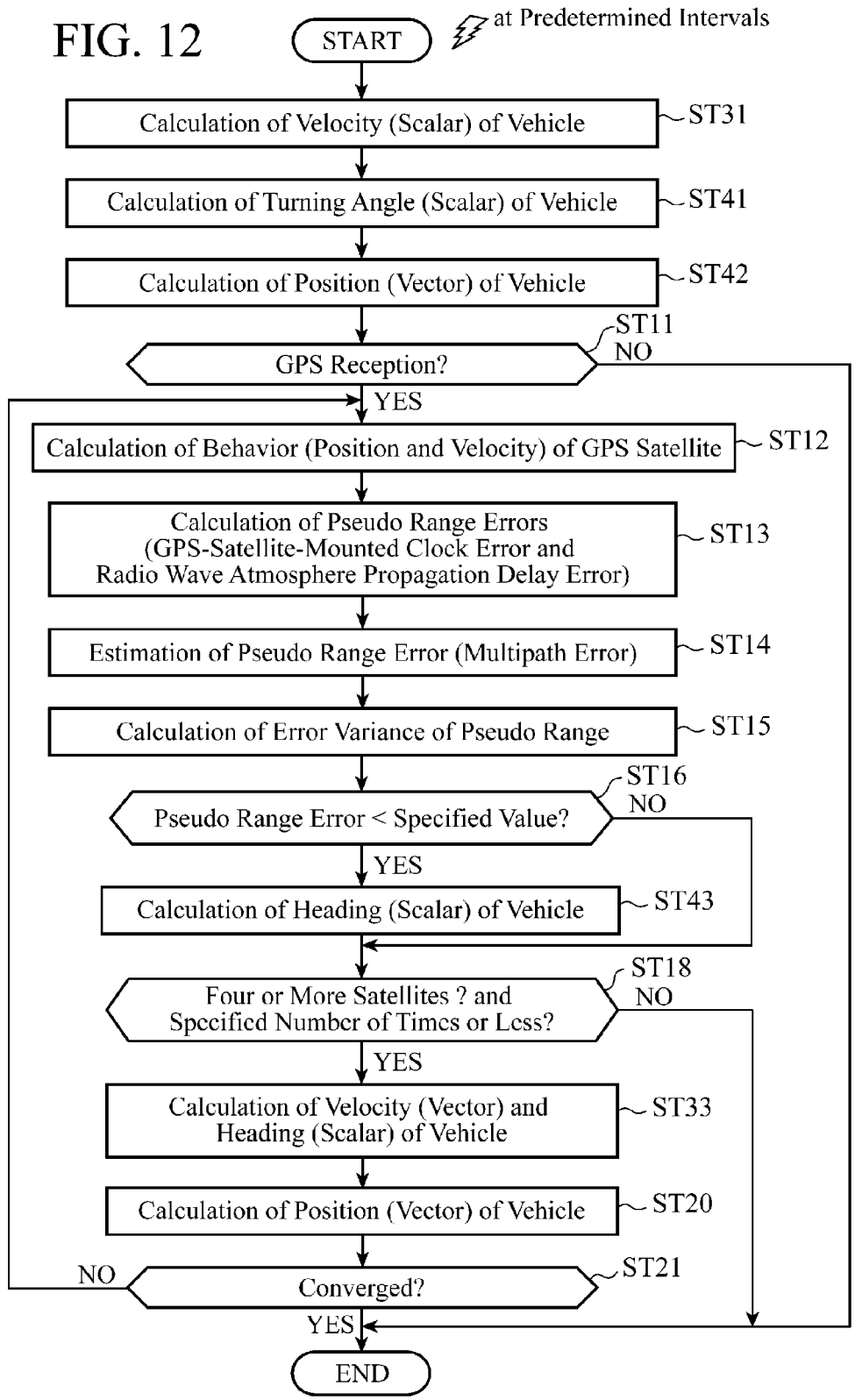
Figure 13:
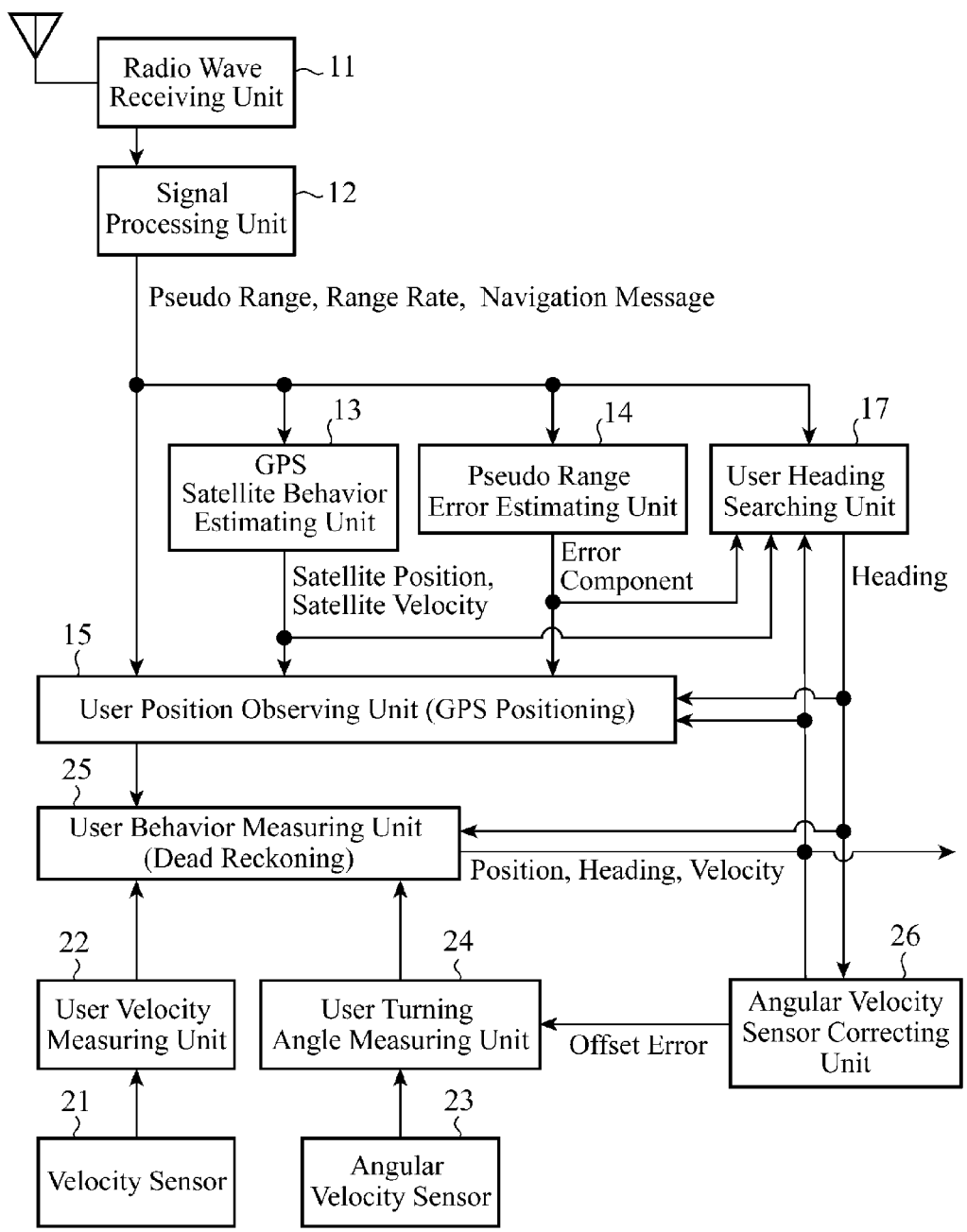
Figure 14:
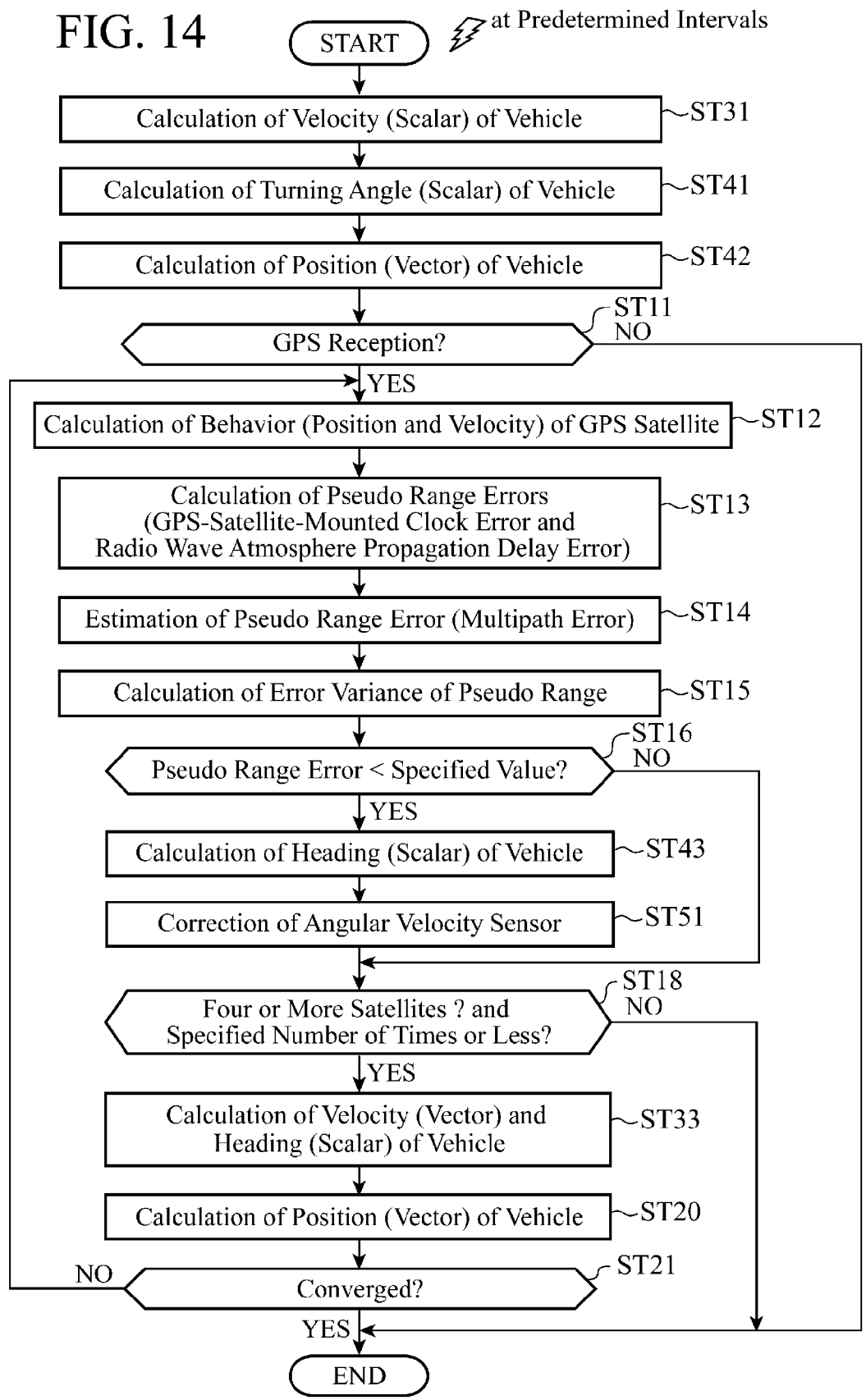
Figure 15:
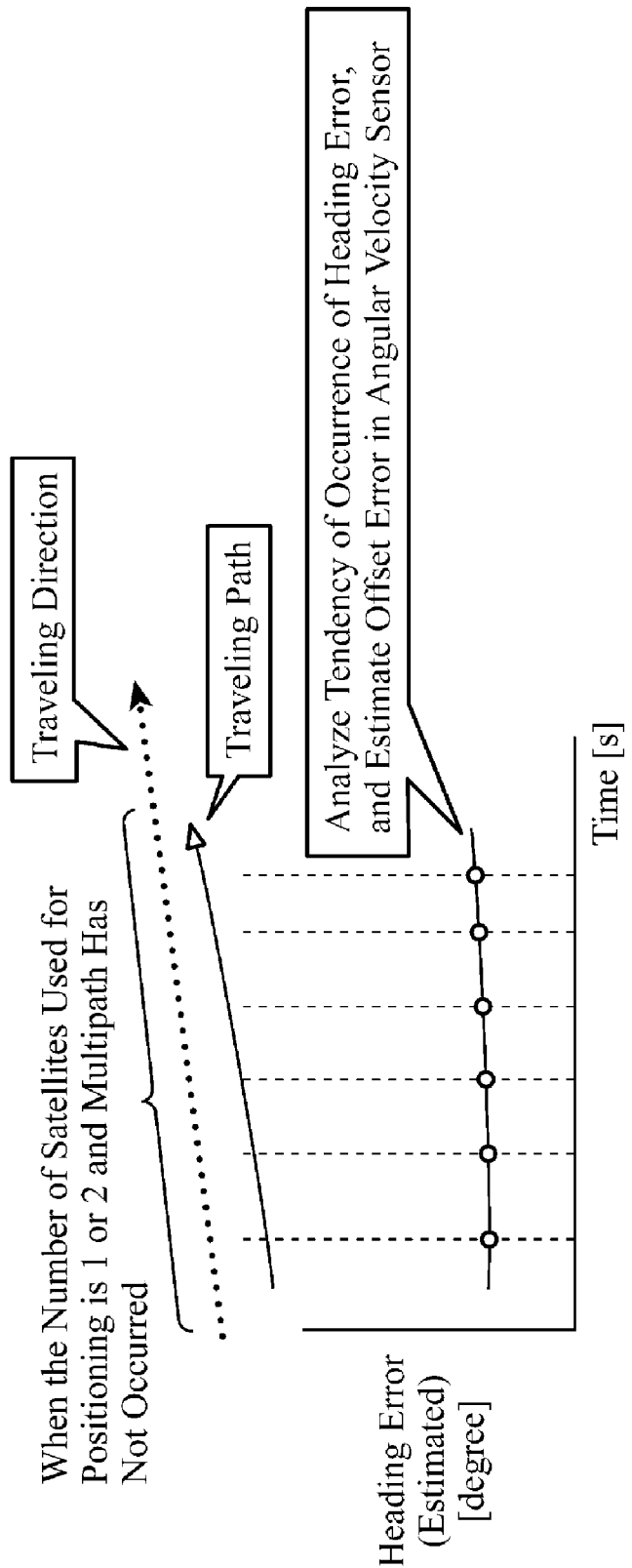
Figure 16:
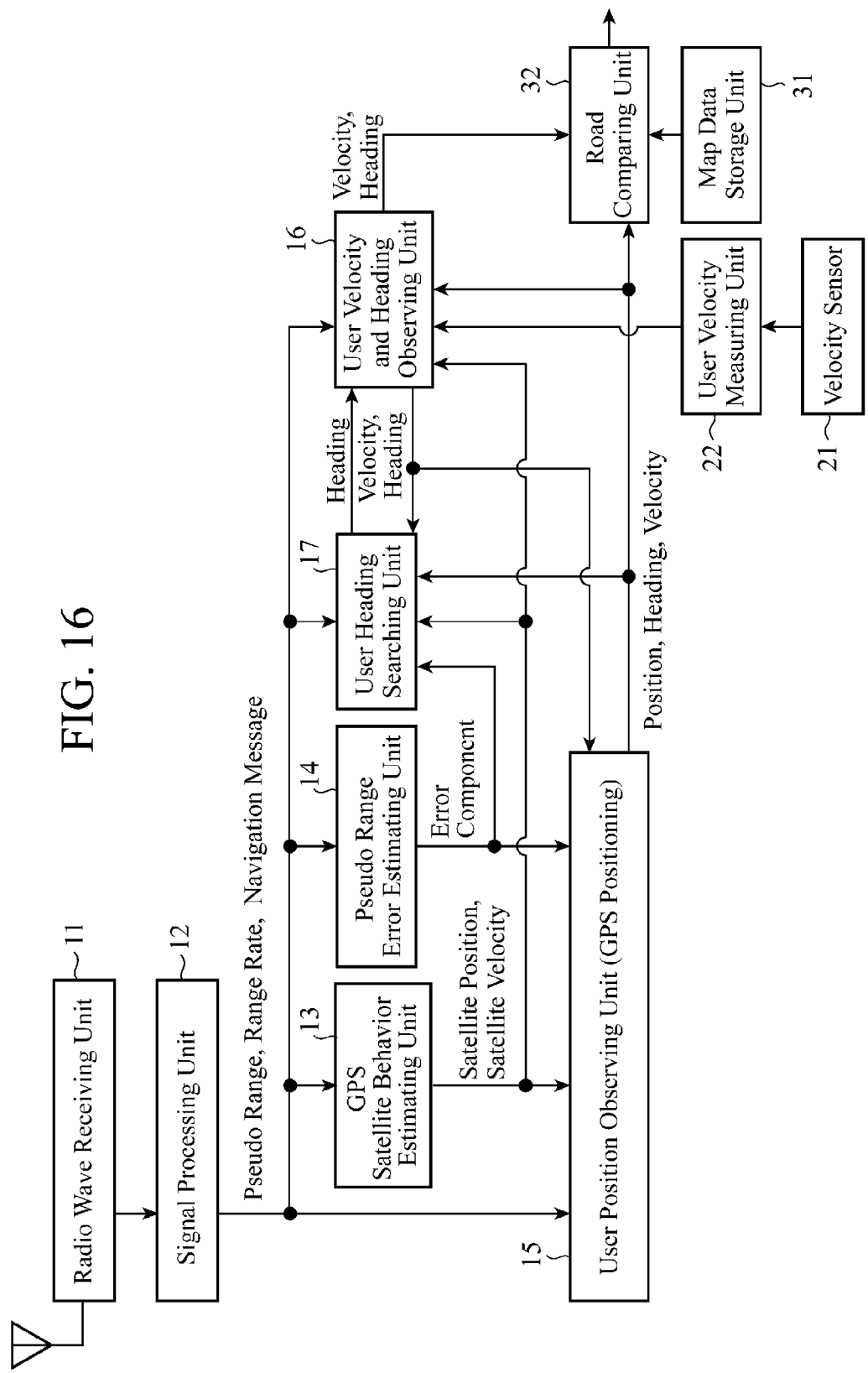
Figure 17:
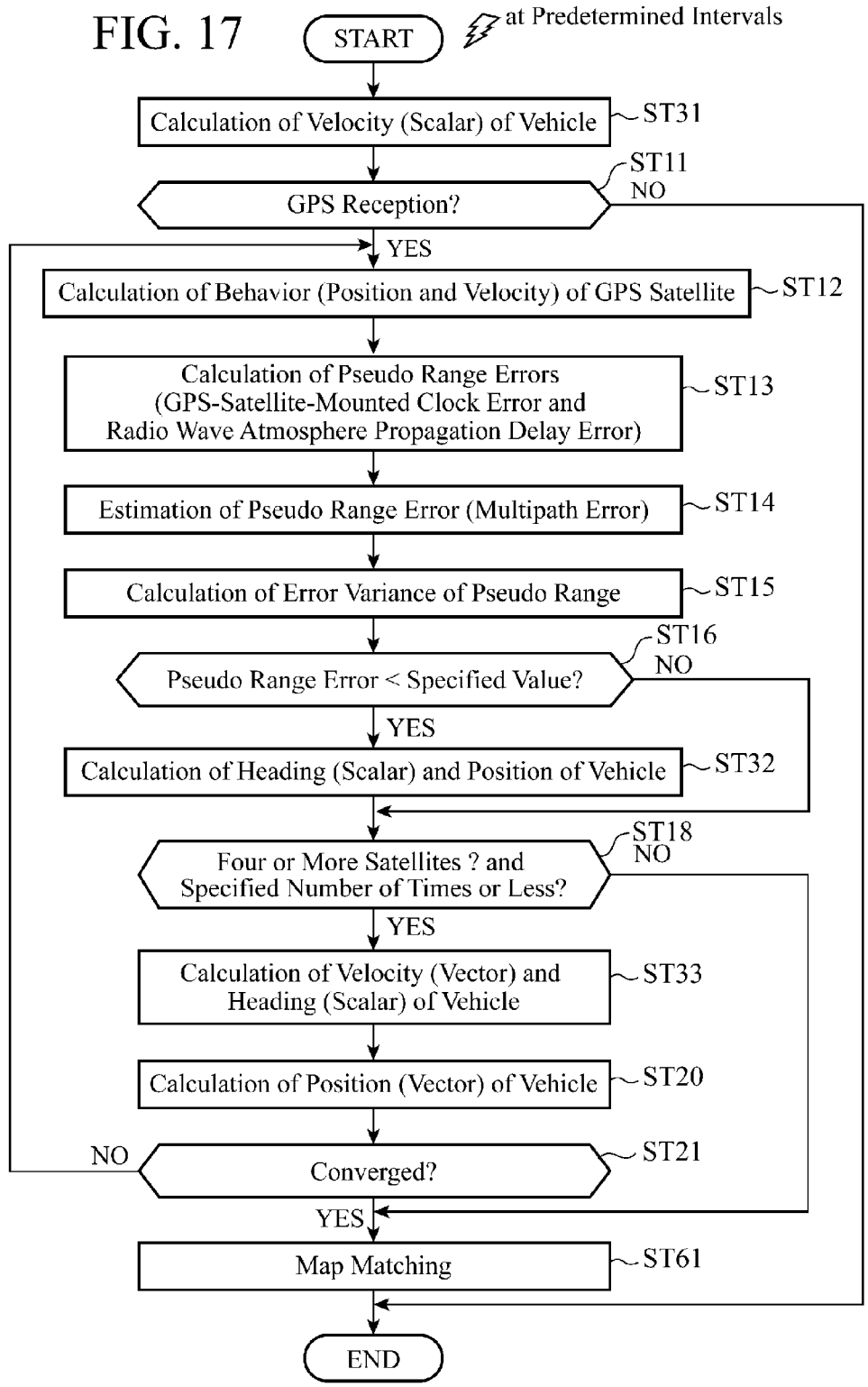
Figure 18:
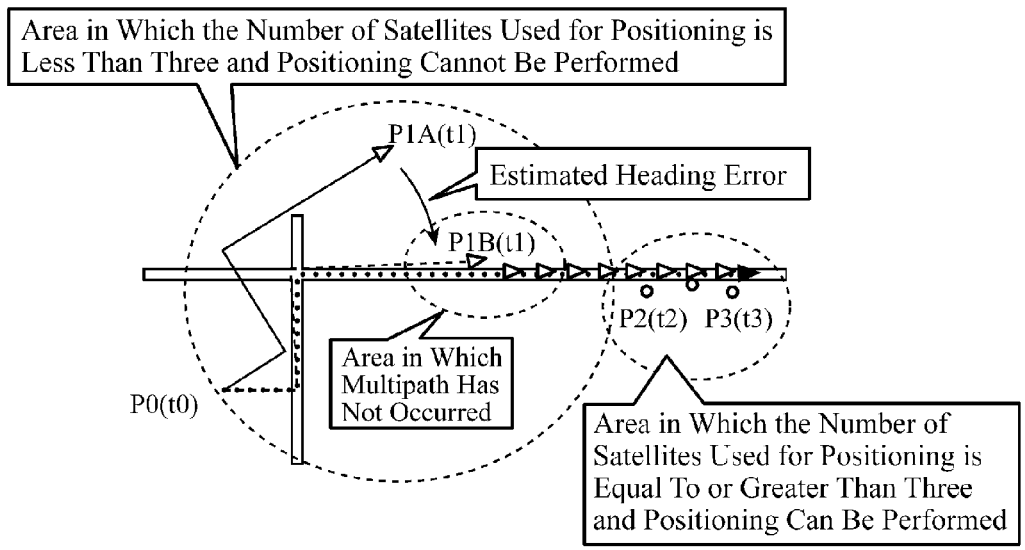
Figure 19:
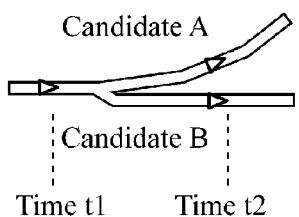
Figure 22:
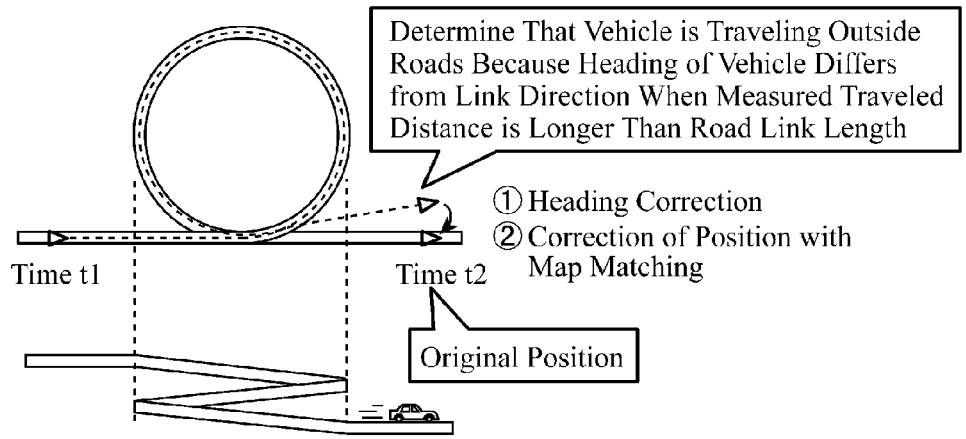
Figure 20:
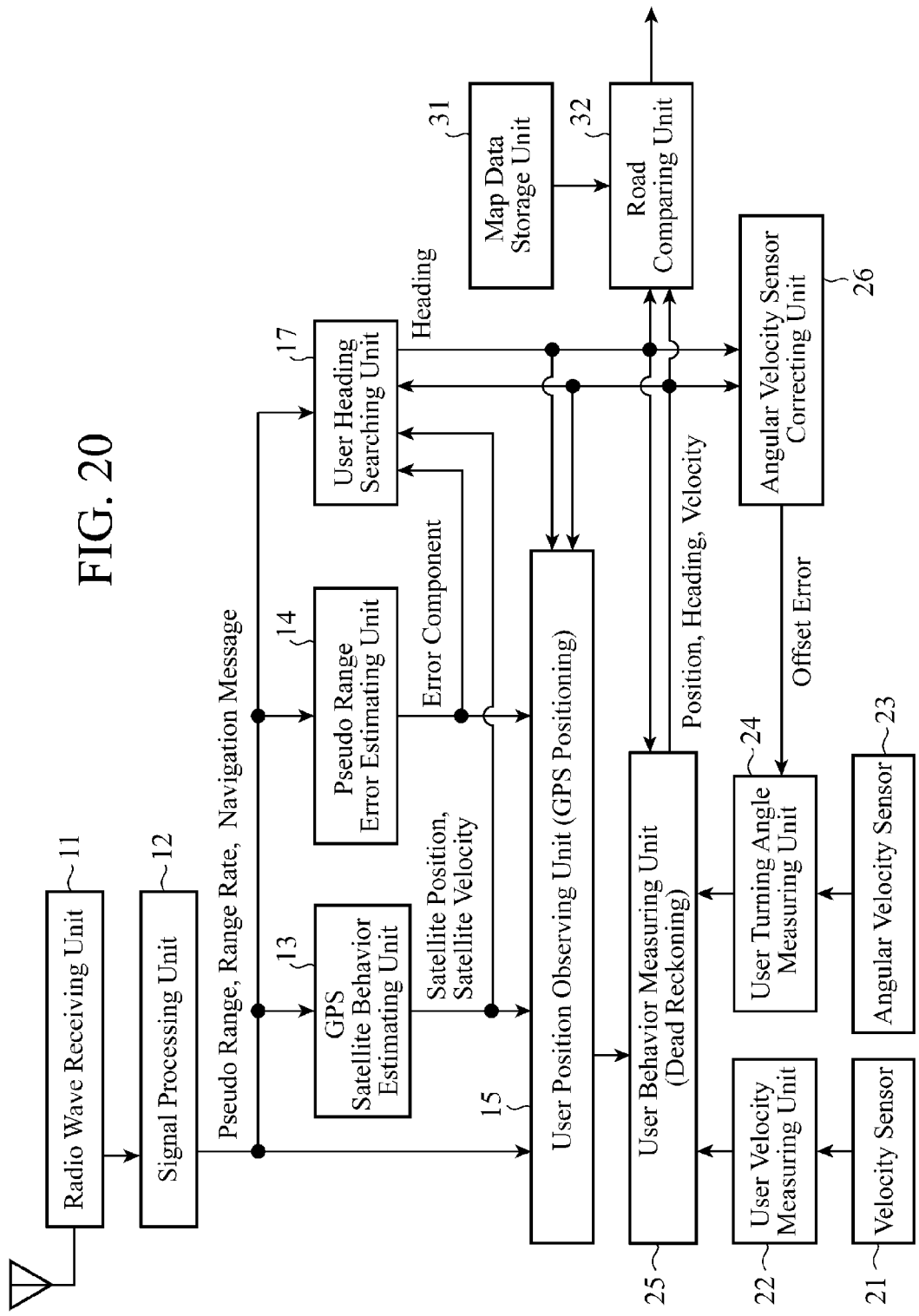
Figure 21:
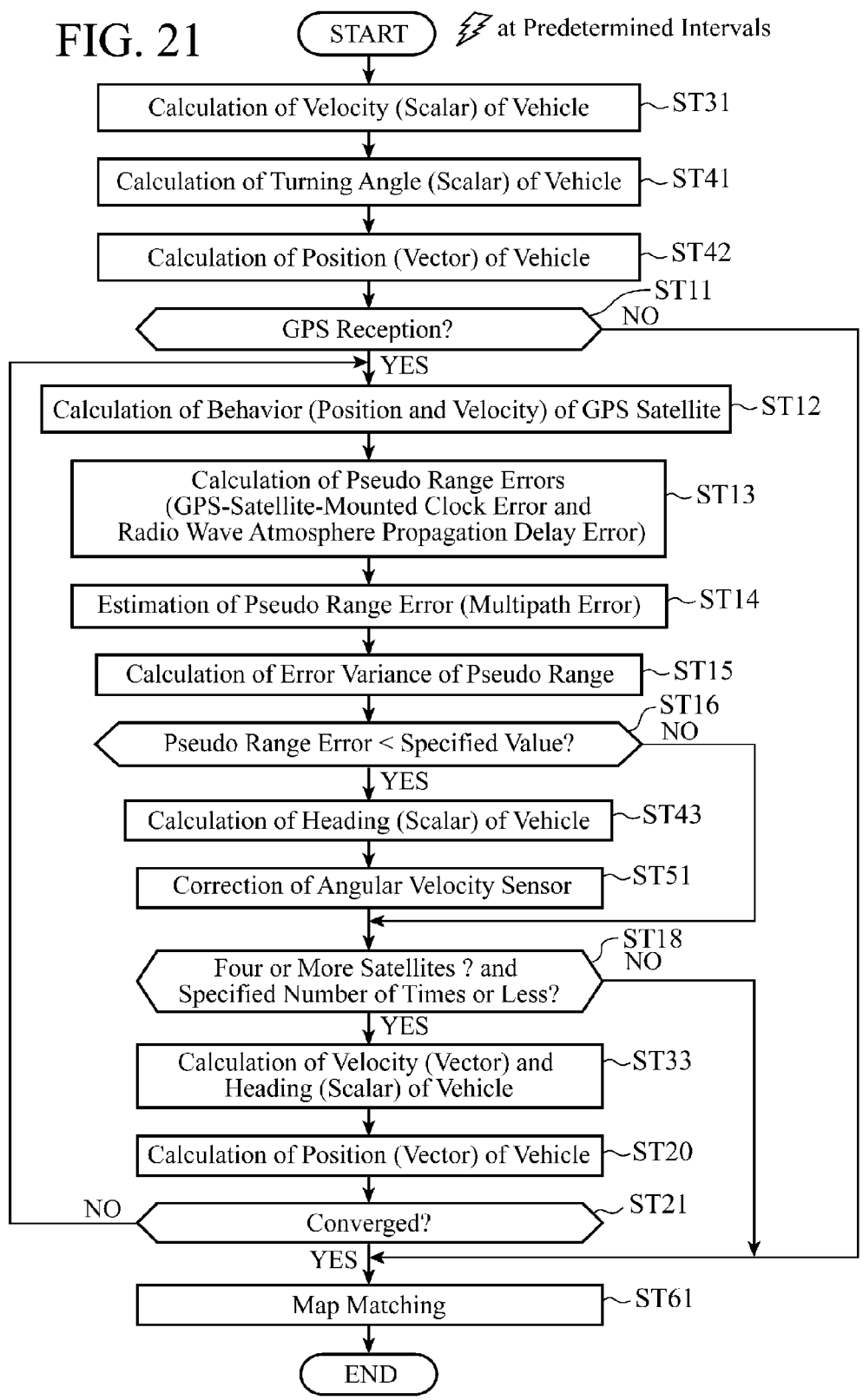

FIG. 7 is a view for explaining a state in which the heading of the vehicle is corrected in the navigation equipment in accordance with Embodiment 1 of the present invention;

FIG. 8 is a view for explaining a position update region which is the inside of a position error circle in the navigation equipment in accordance with Embodiment 1 of the present invention;

FIG. 9 is a block diagram showing the structure of navigation equipment in accordance with Embodiment 2 of the present invention, focusing on a portion required for positioning;

FIG. 10 is a flow chart showing the operation of the navigation equipment in accordance with Embodiment 2 of the present invention, focusing on a positioning process;

FIG. 11 is a block diagram showing the structure of navigation equipment in accordance with Embodiment 3 of the present invention, focusing on a portion required for positioning;

FIG. 12 is a flow chart showing the operation of the navigation equipment in accordance with Embodiment 3 of the present invention, focusing on a positioning process;

FIG. 13 is a block diagram showing the structure of navigation equipment in accordance with Embodiment 4 of the present invention, focusing on a portion required for positioning;

FIG. 14 is a flow chart showing the operation of the navigation equipment in accordance with Embodiment 4 of the present invention, focusing on a positioning process;

FIG. 15 is a view for explaining an offset correction of an angular velocity sensor in the navigation equipment in accordance with Embodiment 4 of the present invention;

FIG. 16 is a block diagram showing the structure of navigation equipment in accordance with Embodiment 5 of the present invention, focusing on a portion required for positioning;

FIG. 17 is a flow chart showing the operation of the navigation equipment in accordance with Embodiment 5 of the present invention, focusing on a positioning process;

FIG. 18 is a view for explaining a heading correction status and a map matching status of a vehicle in the navigation equipment in accordance with Embodiment 5 of the present invention;

FIG. 19 is a view for explaining candidates who are set up in map matching in the navigation equipment in accordance with Embodiment 5 of the present invention;

FIG. 20 is a block diagram showing the structure of navigation equipment in accordance with Embodiment 6 of the present invention, focusing on a portion required for positioning;

FIG. 21 is a flow chart showing the operation of the navigation equipment in accordance with Embodiment 6 of the present invention, focusing on a positioning process; and FIG. 22 is a view for explaining a heading correction status and a map matching status of a vehicle after the vehicle has crossed a loop bridge in the navigation equipment in accordance with Embodiment 6 of the present invention.

PREFERRED EMBODIMENTS OF THE INVENTION

Hereafter, preferred embodiments of the present invention will be described with reference to the accompanying drawings.

Embodiment 1

Figure 1:
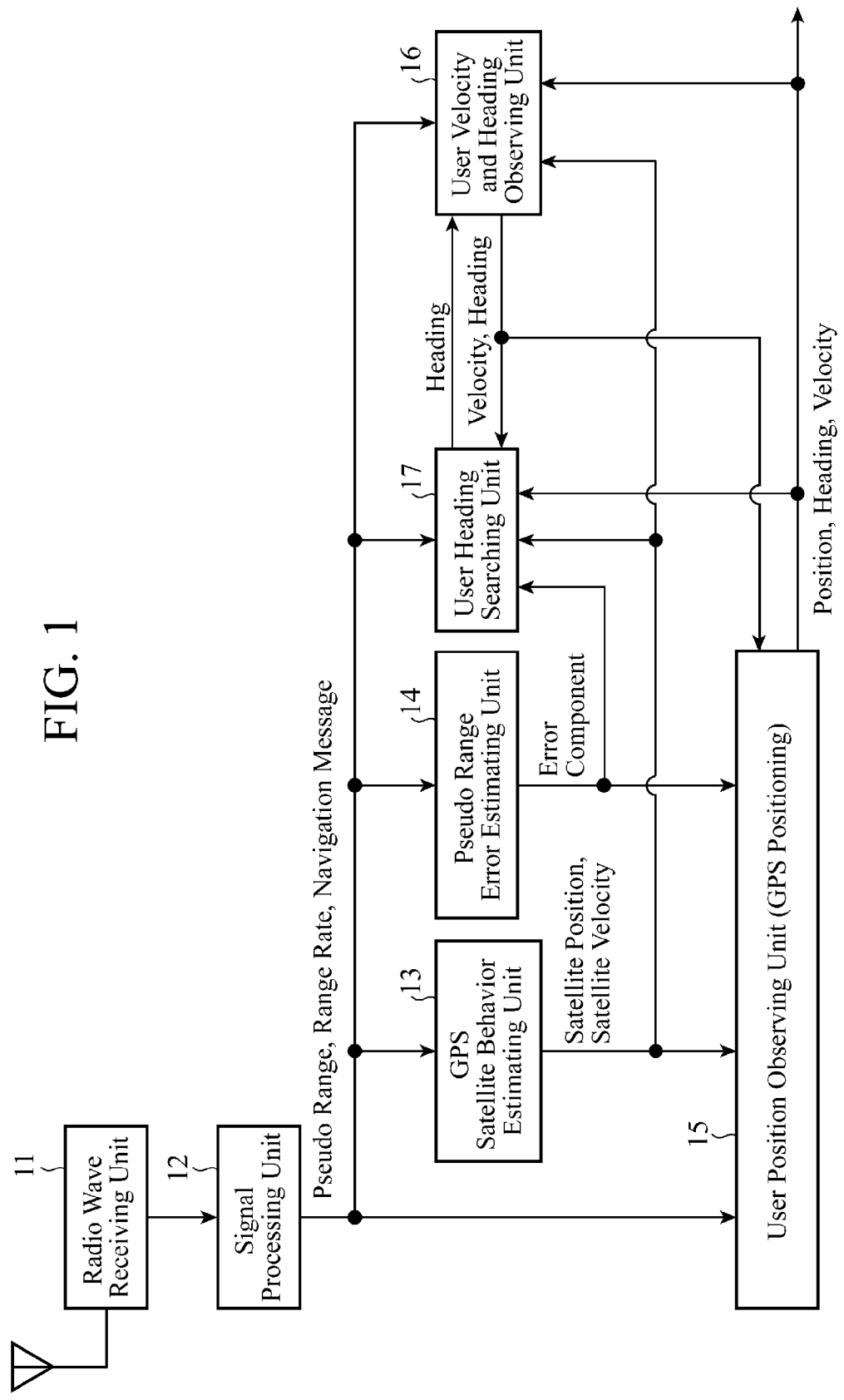
FIG. 1 is a block diagram showing the structure of navigation equipment in accordance with Embodiment 1 of the present invention, focusing on a portion required for positioning.

FIG. 1 is a block diagram showing the structure of navigation equipment in accordance with Embodiment 1 of the present invention, focusing on a portion required for positioning. This navigation equipment is provided with a radio wave receiving unit 11, a signal processing unit 12, a GPS satellite behavior estimating unit 13, a pseudo range error estimating unit 14, a user position observing unit 15, a user velocity and heading observing unit 16, and a user heading searching unit 17.

The radio wave receiving unit 11 has a GPS antenna for receiving radio waves (referred to as "GPS satellite radio waves" from here on) emitted from a plurality of GPS satellites existing over a vehicle equipped with the navigation equipment. The radio wave receiving unit 11 sends received signals which the radio wave receiving unit has acquired by receiving the GPS satellite radio waves by using this GPS antenna to the signal processing unit 12.

The signal processing unit 12 identifies the GPS satellites which have emitted the GPS satellite radio waves from the received signals sent thereto from the radio wave receiving unit 11 so as to calculate a pseudo range of each of the GPS satellites from a propagation delay time of the corresponding GPS satellite radio wave, and also calculates a range rate from the Doppler shift of the carrier frequency of the GPS satellite radio wave. The signal processing unit 12 also extracts a navigation message in which orbit information about each of the GPS satellites and so on are described and the reception time of receiving each of the GPS satellite radio waves from the corresponding received signal sent thereto from the radio wave receiving unit 11. The results of the signal processing performed by this signal processing unit 12 are sent to the GPS satellite behavior estimating unit 13, the pseudo range error estimating unit 14, the user position observing unit 15, the user velocity and heading observing unit 16, and the user heading searching unit 17.

The GPS satellite behavior estimating unit 13 calculates the position and velocity of each of the GPS satellites which vary from moment to moment by using the reception time of receiving the corresponding GPS satellite radio wave and the orbit information (Ephemeris etc.) included in the navigation message which have been extracted by the signal processing unit 12. The calculation results obtained by this GPS satellite behavior estimating unit 13 are sent to the user position observing unit 15, the user velocity and heading observing unit 16, and the user heading searching unit 17.

The pseudo range error estimating unit 14 estimates various error components (a GPS-satellite-mounted clock error, a radio wave ionosphere propagation delay error, a radio wave troposphere propagation delay error, a multipath error, receiver noise, etc.) included in the radio wave propagation delay time which has elapsed until each of the GPS satellite radio waves reaches the GPS antenna by using the reception time of receiving each of the GPS satellite radio waves and correction parameters (a correction parameter for a pseudo range error occurring at the time of passing through the ionosphere, a correction parameter for an error occurring in a clock mounted in each of the GPS satellites) included in the navigation message, the reception time and the navigation message being extracted by the signal processing unit 12. The error components estimated by the pseudo range error estimating unit 14 are informed to the user position observing unit 15 and the user heading searching unit 17.

The user position observing unit 15 measures the current position of the vehicle according to a predetermined calculation formula by using the pseudo range of each of the GPS satellites informed thereto from the signal processing unit 12, the behavior (the position and velocity) of each of the GPS satellites at the reception time which is calculated by the GPS satellite behavior estimating unit 13, the error components in the pseudo range which are estimated by the pseudo range error estimating unit 14, and the position of the vehicle (the previously-calculated position), and also calculates an error occurring in the internal clock of the navigation equipment.

The user velocity and heading observing unit 16 calculates the velocity and heading of the vehicle by using the range rate of each of the GPS satellites at the reception time of receiving the corresponding GPS satellite radio wave, which is calculated by the signal processing unit 12, the behavior (the position and velocity) of each of the GPS satellites at the reception time, which is calculated by GPS satellite behavior estimating unit 13, the errors in the pseudo range, which are estimated by the pseudo range error estimating unit 14, and the user's position, and informs the velocity and heading of the vehicle to the user heading searching unit 17.

As to a GPS satellite radio wave whose pseudo range error (the multipath error) estimated by the pseudo range error estimating unit 14 is equal to or smaller than a specified value, the user heading searching unit 17 compares the range rate calculated by the signal processing unit 12 with a range rate which this user heading searching unit 17 has estimated, and searches for the heading (showing the heading of the vehicle) which the user heading searching unit has used for calculation of the estimated value at the time when this estimated value matches the range rate calculated by the signal processing unit.

Figure 2:
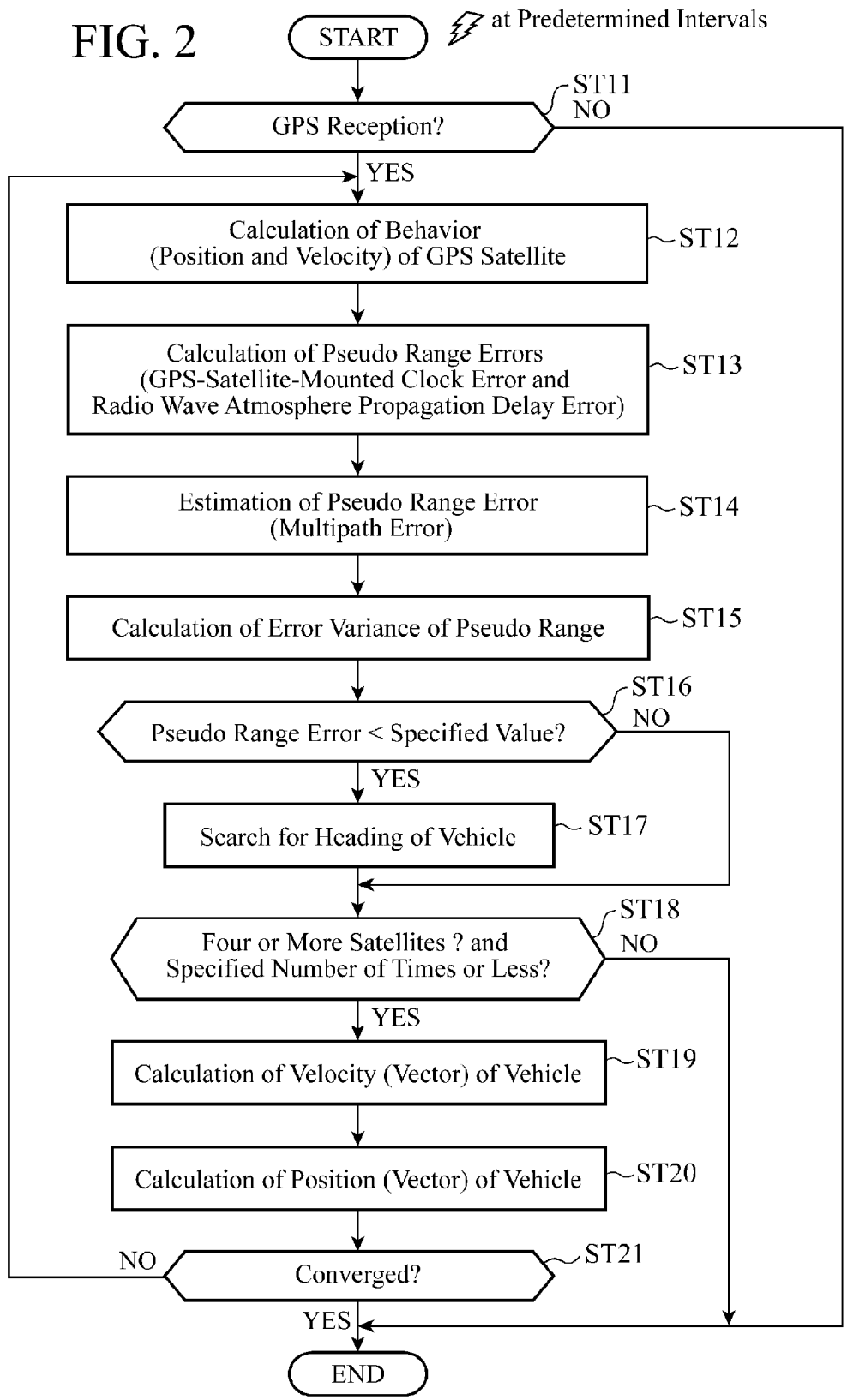
FIG. 2 is a flow chart showing the operation of the navigation equipment in accordance with Embodiment 1 of the present invention, focusing on a positioning process.

Next, the operation of the navigation equipment in accordance with Embodiment 1 of the present invention which is constructed as mentioned above will be explained with reference to a flow chart shown in FIG. 2 and explanatory drawings shown in FIGS. 3 to 8, focusing on a positioning process which the navigation equipment starts at predetermined intervals.

In the positioning process, the navigation equipment checks to see whether or not it is performing GPS reception first (step ST11). More specifically, the signal processing unit 12 checks to see whether or not the navigation equipment is receiving GPS satellite radio waves by watching, for example, a state of update of the reception time of receiving each of the GPS satellite radio waves which is extracted from the corresponding received signal sent thereto from the radio wave receiving unit 11. When, in this step ST11, judging that the navigation equipment is not receiving any GPS satellite radio waves, the signal processing unit ends the positioning process.

In contrast, when, in step ST11, judging that the navigation equipment is receiving GPS satellite radio waves, the signal processing unit calculates the behavior (the position and velocity) of each of the GPS satellites (step ST12). More specifically, after calculating back to the transmission time at which each of the GPS satellite radio waves was transmitted from the reception time of receiving the corresponding GPS satellite radio wave, which is extracted by the signal processing unit 12, the GPS satellite behavior estimating unit 13 calculates the position and velocity of each of the GPS satellites at the transmission time of the corresponding GPS satellite radio wave according to the predetermined calculation formula by using the orbit information (Ephemeris) included in the navigation message about the corresponding GPS satellite. The GPS satellite behavior estimating unit 13 then sends these calculation results to the user position observing unit 15, the user velocity and heading observing unit 16, and the user heading searching unit 17.

The navigation equipment then calculates pseudo range errors (a GPS-satellite-mounted clock error and a radio wave atmosphere propagation delay error) (step ST13). More specifically, the pseudo range error estimating unit 14 calculates, as errors included in the pseudo range informed thereto from the signal processing unit 12, a GPS-satellite-mounted clock error, a radio wave atmosphere (ionosphere and troposphere) propagation delay error according to the following equations (1) and (2) by using the predetermined parameters included in the navigation message. In the equation (2), because the GPS receiver noise is nearly equal in amount for every channel of the signal processing unit 12, the pseudo range error estimating unit determines the GPS receiver noise when the navigation equipment receives GPS satellite radio waves having no influence of multipath propagation.

[Equation 1]

$$d\rho(T_2) = \rho_{c\tau} - (\|Ps - Po\| + c(dT_2 - dT_1) + \epsilon) \quad (1)$$

where $d\rho(T_2)$: the error in the pseudo range between each of the GPS satellites and the vehicle [m], $T_1$: the transmission time at which each of the GPS satellite radio waves was transmitted ($=T_2 - \|Ps - Po\|/c$) [s], $T_2$: the reception time of receiving each of the GPS satellite radio waves [s], Ps: the position of each of the GPS satellites (calculated from the navigation message) ($x_s, y_s, z_s$) [m], Po: the position ($x_o, y_o, z_o$) of the vehicle [m], $\|Ps - Po\|$: the straight-line distance between the position Ps of each of the GPS satellites and the vehicle position Po [m]=$((x_s - x_o)^2 + (y_s - y_o)^2 + (z_s - z_o)^2)^{1/2}$, c: the light velocity (=$2.99792458 \times 10^8$) [m/s], $\tau$: the radio wave propagation time between each of the GPS satellites and the vehicle [s], $\rho_{c\tau}$: the pseudo range (=$c\tau$) [m], $dT_1$: the GPS-satellite-mounted clock error (calculated by using the navigation message) [s], $dT_2$: the navigation equipment internal clock error [s], $\epsilon$: the error in the pseudo range (calculated by using the equation (2)) [m], $d_{iono}$: the radio wave ionosphere propagation delay error [m], $d_{trop}$: the radio wave troposphere propagation delay error [m], and $d_{mp}$: the multipath error (unknown) [m].

[Equation 2]

$$\epsilon = \rho_{c\tau} - (\|Ps - Po\| + c(dT_2 - dT_1) + d_{iono} + d_{rev} + d_{trop}) \quad (2)$$

where $d_{iono}$: the radio wave ionosphere propagation delay error (calculated by using the navigation message) [m], $d_{trop}$: the radio wave troposphere propagation delay error (calculated according to a predetermined error model) [m], $d_{rev}$: the receiver noise (equal for every receiver channel) [m], and $d_{mp}$: the multipath error (=0; in the case of a GPS satellite having a large elevation angle) [m].

The navigation equipment then estimates the pseudo range error (the multipath error) (step ST14). More specifically, the pseudo range error estimating unit 14 calculates the multipath error included in the pseudo range by comparing the delta range measured by the signal processing unit 12 with the range rate, and sends the calculation result to the user position observing unit 15 and the user heading searching unit 17. Because the calculation of the multipath error is described in detail in patent reference 3, please refer to this patent reference as needed.

The navigation equipment then carries out calculation of an error variance of the pseudo range (step ST15). More specifically, the pseudo range error estimating unit 14 calculates a variance per predetermined time of the pseudo range error (the multipath error) in each of the GPS satellite radio waves which is calculated in step ST14, and sends the calculation result to the user position observing unit 15 and the user heading searching unit 17.

The navigation equipment then checks to see whether or not the pseudo range error is smaller than a specified value (step ST16). More specifically, the user heading searching unit 17 compares the pseudo range error (only the multipath error), which is calculated in step ST14 and informed thereto from the pseudo range error estimating unit 14, with the specified value. When, in this step ST16, determining that the pseudo range error is smaller than the specified value, the user heading searching unit determines that it can search for the heading of the vehicle, and then advances the sequence to step ST17. In contrast, when, in this step ST16, determining that the pseudo range error is equal to or larger than the specified value, the user heading searching unit determines that it cannot search for the heading of the vehicle, and then skips step ST17 and advances the sequence to step ST18.

For example, when the vehicle is travelling along a country road, the navigation equipment performs the process of step ST17 on most of the received GPS satellite radio waves. In contrast, when the vehicle is traveling along a road in an urban area, because GPS satellite radio waves are blocked or reflected by buildings or the like extending along the road, as shown in, for example, FIG. 3, the navigation equipment does not perform the process of step ST17 on most of the received GPS satellite radio waves. Even when the vehicle is traveling along a road in an urban area, because the radio wave from either a GPS satellite existing over the vehicle in a direction (a zenith direction) having a large elevation angle or a GPS satellite existing in a direction of the road (there is a case in which the GPS satellite has a small elevation angle) is hard to be affected by the influence of multipath propagation, the navigation equipment performs the process of step ST17 on the radio wave discretely.

Figure 5:
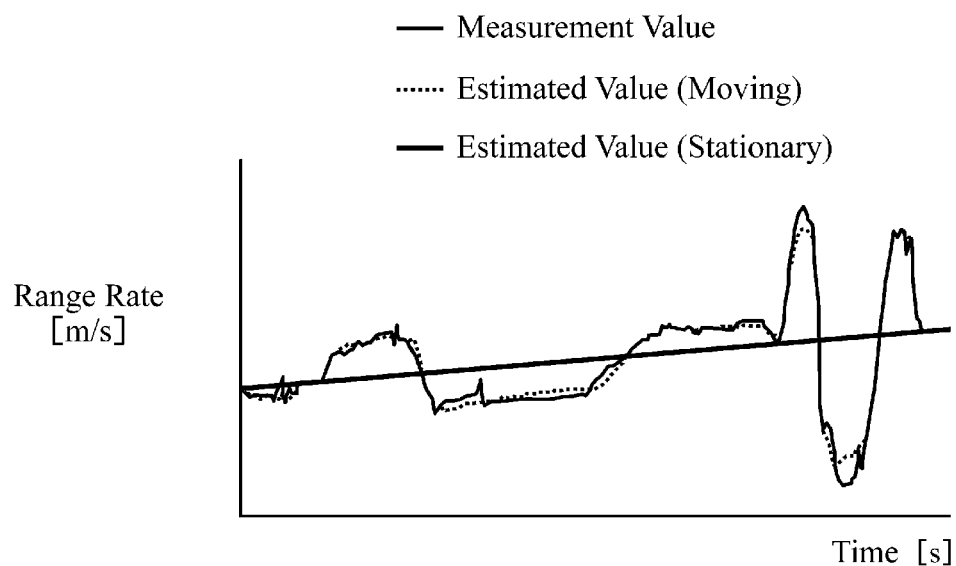
FIG. 5 is a figure showing an example of transition of a measurement value and estimated values (estimated conditions: moving and stationary) of a range rate in the navigation equipment in accordance with Embodiment 1 of the present invention.
Figure 6:
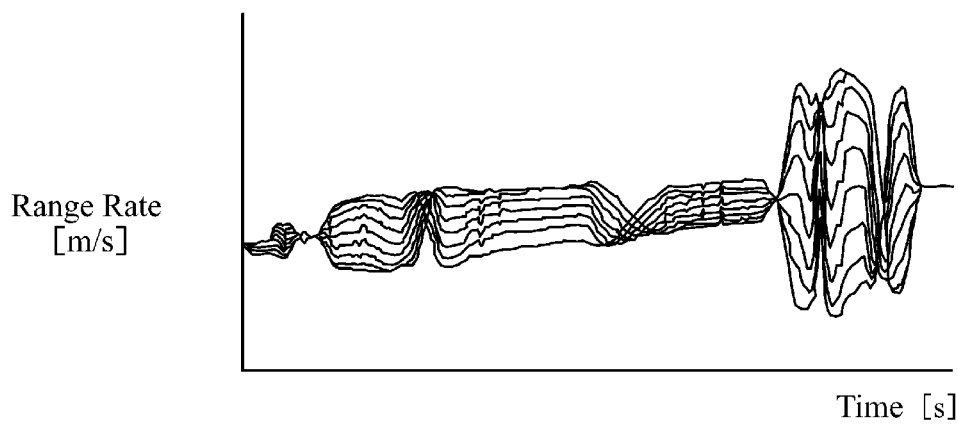
FIG. 6 is a figure showing waveforms of the range rate (an estimated value) which are calculated with a heading error in increments of 20 degrees within an angle range from −180 degrees to −20 being added to the range rate in the navigation equipment in accordance with Embodiment 1 of the present invention.

The navigation equipment, in step ST17, carries out a search for the heading of the vehicle. More specifically, the user heading searching unit 17 analyzes the range rate which is measured by the signal processing unit 12 and is not affected by the influence of multipath propagation, and searches for the heading of the vehicle. FIG. 4 is a figure showing an example of transition of the heading and velocity of the vehicle acquired through GPS positioning. Assuming now that the heading and velocity of the vehicle vary respectively as shown in FIGS. 4(*a*) and 4(*b*), the range rate measured by the signal processing unit 12 varies as shown by a "measurement value" in FIG. 5. FIG. 5 shows an example of transition of the measurement value and estimated values (estimation conditions: moving and stationary) of the range rate. FIG. 6 is a figure showing waveforms of the range rate (an estimated value) which are calculated with a heading error in increments of 20 degrees within an angle range from −180 degrees to −20 being added to the range rate.

Because this range rate of a GPS satellite can be measured from the Doppler shift of the carrier frequency of the GPS satellite radio wave from the GPS satellite, if the position and velocity of the GPS satellite and the position and velocity of the vehicle are known, the range rate can be calculated as a relative movement between them according to the following equation (3). When the vehicle is stationary, the waveform of the range rate which is calculated with the velocity of the vehicle in the equation (3) being set to zero is shown by the "estimated value (stationary)" of FIG. 5, while when the vehicle is traveling, the waveform of the "estimated value (stationary)" varies according to the heading and velocity of the vehicle and then becomes the one of the "estimated value (moving)".

The navigation equipment, in this step ST17, calculates the velocity vector of the vehicle and the range rate at a time when the vehicle changes its heading within a predetermined angle range, and searches for the heading in such a way as to assume, as the heading of the vehicle, the heading at a time when the difference between the waveform acquired through this calculation and the waveform (the "measurement value") acquired through the measurement is equal to or smaller than a specified value. When, in this step ST17, searching for the heading, the navigation equipment compares the heading which it has searched for with the heading of the vehicle. Then, when the difference between them is equal to or larger than a predetermined angle, the navigation equipment determines that the heading of the vehicle has a large error, and corrects the heading of the vehicle with reference to the heading which it has searched for, as shown in FIG. 7.

[Equation 3]

$$\Delta\rho_{rate-est} = LOS_x \times (Vs_x - Vo_x) + LOS_y(Vs_y - Vo_y) + LOS_z(Vs_z - Vo_z) \quad (3)$$

where
$LOS_x = (x_o - x_s)/\|Ps - Po\|$,
$LOS_y = (y_o - y_s)/\|Ps - Po\|$,
$LOS_z = (z_o - z_s)/\|Ps - Po\|$, and
$\|Ps - Po\| = \{(x_s - x_o)^2 + (y_s - y_o)^2 + (z_s - z_o)^2\}^{1/2}$,
and where $\Delta\rho_{rate-est}$: the estimated value of the range rate [m/s], Ps: the position of each of the GPS satellites (calculated from the navigation message) ($x_s$, $y_s$, $z_s$) [m], Vs: the velocity of each of the GPS satellites (calculated from the navigation message) ($v_s$, $v_s$, $v_s$) [m], Po: the position of the vehicle ($x_o$, $y_o$, $z_o$) [m], Vs: the velocity of the vehicle ($v_s$, $v_s$, $v_s$) [m], $\|Ps - Po\|$: the distance between the position of each of the GPS satellites and the position of the vehicle [m], and LOS: the line of sight vector extending from the vehicle toward each of the GPS satellites.

The navigation equipment then checks to see whether the GPS satellite radio waves have been received from four or more satellites and whether a convergence calculation has been carried out a specified number of times or less (step ST18). More specifically, the user velocity and heading observing unit 16 checks to see whether or not the number of received GPS satellite radio waves is four or more, and whether the number of times that a convergence calculation has been carried out is equal to or less than the specified number of times. When, in this step ST18, determining that the number of received GPS satellite radio waves is less than four or the number of times that a convergence calculation has been carried out exceeds the specified number of times, the user velocity and heading observing unit determines that it cannot carry out positioning and ends the positioning process.

In contrast, when, in step ST18, determining that the number of received GPS satellite radio waves is equal to or greater than four and the number of times that a convergence calculation has been carried out is equal to or less than the specified number of times, the user velocity and heading observing unit calculates the velocity (vector) of the vehicle (step ST19). More specifically, the user velocity and heading observing unit 16 calculates the velocity vector of the vehicle according to equation (4) by using the range rate, the position and velocity of each of the GPS satellites at the reception time informed thereto from the GPS satellite behavior estimating unit 13, the position and velocity of the vehicle, and the range rate of each of the GPS satellites at the reception time of receiving the corresponding GPS satellite radio wave, which is informed thereto from the signal processing unit 12. The user velocity and heading observing unit 16 also calculates the heading (scalar) of the vehicle from the calculated velocity components in the X, Y, and Z-axes, and the position of the vehicle (n in the equation (4) shows an element number in a matrix, and is not PRN (Pseudo Random Noise code). The equation (4) is the one in which Vo is set to 0 in the equation (3).

[Equation 4]

$$\Delta \rho_{rate-est} = LOS_x \times V_{s_x} + LOS_y \times V_{s_y} + LOS_z \times V_{s_z} \quad (4)$$

$$V_o = (A^T W A)^{-1} (A^T W) \times \begin{vmatrix} \Delta \rho_{rate-mes}^1 & -\Delta \rho_{rate-est}^1 \\ \Delta \rho_{rate-mes}^2 & -\Delta \rho_{rate-est}^2 \\ \vdots & \vdots \\ \Delta \rho_{rate-mes}^n & -\Delta \rho_{rate-est}^{n1} \end{vmatrix}$$

$$W = \begin{vmatrix} 1/(\rho_{\delta p}^1)^2 & 0 & 0 & 0 \\ 0 & 1/(\rho_{\delta p}^1)^2 & 0 & 0 \\ \vdots & \vdots & \vdots & \vdots \\ 0 & 0 & 0 & 1/(\rho_{\delta p}^1)^2 \end{vmatrix}$$

$$A = \begin{vmatrix} LOS_x^1 & LOS_y^1 & LOS_z^1 & 1 \\ LOS_x^2 & LOS_y^2 & LOS_z^2 & 1 \\ \vdots & \vdots & \vdots & \vdots \\ LOS_x^n & LOS_y^n & LOS_z^n & 1 \end{vmatrix}$$

where $\Delta \rho_{rate-mes}$: the measurement value of the range rate [m/s], $\Delta \rho_{rate-est}$: the estimated value of the range rate [m/s], Vo: the velocity of the vehicle (Vox, Voy, Voz, Vot) [m/s], A: a navigation matrix, W: a weighted matrix, and $\sigma_{\delta \rho}$: the standard deviation of the pseudo range error.

The navigation equipment then calculates the position (vector) of the vehicle (step ST20). More specifically, the user position observing unit 15 determines, as a solution which reduces the sum of the squares of the pseudo range errors to a minimum, an error in the position of the vehicle and an error in the internal clock of the navigation equipment according to a weighted least squares method or the like by using, for example, the equation (5) so as to correct the position of the vehicle and the internal clock of the navigation equipment. In this case, when, in step ST17, succeeding in searching for the heading, the navigation equipment makes an adjustment so as to update the position of the vehicle within a predetermined angle range including this heading, as shown in a position update region which is the inside of a position error circle of FIG. 8. The navigation equipment then checks to see whether or not a convergence has occurred by observing the position error in the position of the vehicle (step ST21). More specifically, the user position observing unit 15 judges whether or not a convergence has occurred by observing the position error in the position of the vehicle. When the position error is less than a specified value, the user position observing unit determines that it has succeeded in measuring the position of the vehicle and ends the positioning process, whereas when the position error is equal to or greater than the specified value, the user position observing unit determines that no convergence has occurred, and returns the sequence to step ST12 and repeatedly performs the above-mentioned processes (a convergence will occur after the series of processes is carried out several times).

[Equation 5]

$$\delta P_o = (A^T W A)^{-1} (A^T W) \times \begin{vmatrix} \rho^1 - R^1 \\ \rho^2 - R^2 \\ \vdots \\ \rho^n - R^n \end{vmatrix} \quad (5)$$

$$P_o = P_o + \delta P_o$$

$$R = \{(P_{sx} - P_{ox})^2 + (P_{sy} - P_{oy})^2 + (P_{sz} - P_{oz})^2\}^{1/2}$$

$\delta P_o$: the position error in the position of the vehicle ($\delta P_{o_x}$, $\delta P_{o_y}$, $\delta P_{o_z}$, $\delta P_{o_t}$) [m] ($\delta P_{o_t}/c$: the clock error), Po: the position of the vehicle ($P_{o_x}$, $P_{o_y}$, $P_{o_z}$, $P_{o_t}$) [m], A: the navigation matrix, W: the weighted matrix, $\sigma_{\delta \rho}$: the standard deviation of the pseudo range error, and c: the light velocity ($=2.99792458 \times 10^8$) [m/s].

The navigation equipment is constructed in such a way as to, in the above-mentioned positioning process, calculate the velocity and position of the vehicle by using a weighted least squares method. As an alternative, the navigation equipment can be constructed in such a way as to calculate the velocity and position of the vehicle by using sequential calculations or a Kalman filter.

As previously explained, the navigation equipment in accordance with Embodiment 1 of the present invention compares the delta range of each of GPS satellites which is easily affected by the influence of multipath propagation with the range rate of each of the GPS satellites which cannot be easily affected by the influence of multipath propagation so as to determine a pseudo range error in the pseudo range caused by the influence of multipath propagation. Therefore, the navigation equipment can grasp the influence of multipath propagation for each of the GPS satellites.

Furthermore, as to the range rate which is not affected by influence of multipath propagation, the navigation equipment compares a measurement value with an estimated value, and can detect the heading of the vehicle from the heading used for calculation of the estimated value at the time when the measurement value and the estimated value match each other. In a case in which, for example, the field of vision over the vehicle becomes narrowed because of buildings when the vehicle is traveling along a road in an urban area and therefore the number of GPS satellites which can be used for the positioning is reduced to one or two, or when having still received only one or two GPS satellite radio waves after powered on, a conventional navigation equipment cannot carry out the GPS positioning and therefore stops update of the position and heading of the vehicle. In contrast, even in such a case, the navigation equipment in accordance with this Embodiment 1 can detect the heading of the vehicle and can notify the heading of the vehicle to the driver and so on.

Embodiment 2

FIG. 9 is a block diagram showing the structure of navigation equipment in accordance with Embodiment 2 of the present invention, focusing on a portion required for positioning.

The navigation equipment in accordance with this Embodiment 2 is constructed in such a way that a velocity sensor 21 and a user velocity measuring unit 22 are added to the navigation equipment in accordance with Embodiment 1, and the function of the user velocity and heading observing unit 16 is changed. Hereafter, the same components as those of the navigation equipment in accordance with Embodiment 1 are designated by the reference numerals used in Embodiment 1 respectively, and the explanation of the components will be omitted hereafter and only different components will be explained hereafter.

The velocity sensor 21 outputs a pulse signal according to the velocity of the vehicle. The pulse signal outputted from this velocity sensor 21 is sent to the user velocity measuring unit 22. The user velocity measuring unit 22 converts the pulse signal sent thereto from the velocity sensor 21 into the velocity of the vehicle. The velocity of the vehicle acquired by this user velocity measuring unit 22 is informed to a user velocity and heading observing unit 16. After measuring the velocity (vector) of the vehicle by using the GPS and the velocity sensor 21 together, the user velocity and heading observing unit 16 calculates the heading of the vehicle from the velocity of the vehicle in each of X, Y, and Z-axes, and the position of the vehicle.

Next, the operation of the navigation equipment in accordance with Embodiment 2 of the present invention which is constructed as mentioned above will be explained with reference to a flow chart shown in FIG. 10, focusing on a positioning process. The steps in which the same processes as those carried out by the navigation equipment in accordance with Embodiment 1 shown in the flow chart of FIG. 2 are performed are designated by the same reference characters as those used in FIG. 2 respectively, and the explanation of the steps will be simplified hereafter and steps in which different processes are carried out will be explained mainly.

In the positioning process, the navigation equipment performs calculation of the velocity (scalar) of the vehicle first (step ST31). More specifically, the user velocity measuring unit 22 converts the pulse signal sent thereto from the velocity sensor 21 into the velocity (scalar) of the vehicle, and informs the velocity to the user velocity and heading observing unit 16. The navigation equipment then checks to see whether or not it is performing GPS reception (step ST11). When the navigation equipment, in this step ST11, determines that it is not performing GPS reception, the navigation equipment ends the positioning process. In contrast, when the navigation equipment, in step ST11, determines that it is performing GPS reception, the navigation equipment calculates the behavior (the position and velocity) of each of the GPS satellites (step ST12).

The navigation equipment then calculates pseudo range errors (a GPS-satellite-mounted clock error and a radio wave atmosphere propagation delay error) (step ST13). The navigation equipment further estimates a pseudo range error (a multipath error) (step ST14). The navigation equipment then calculates an error variance of the pseudo range (step ST15). The navigation equipment then checks to see whether or not the pseudo range error is smaller than a specified value (step ST16). When, in this step ST16, determining that the pseudo range error is smaller than the specified value, the user navigation equipment determines that it can search for the heading of the vehicle, and then advances the sequence to step ST32. In contrast, when, in this step ST16, determining that the pseudo range error is equal to or larger than the specified value, the navigation equipment determines that it cannot search for the heading of the vehicle, and then skips step ST32 and advances the sequence to step ST18.

In step ST32, the navigation equipment calculates the heading (scalar) and position of the vehicle. More specifically, the user heading searching unit 17 calculates the velocity vector of the vehicle and the range rate at a time when the vehicle changes its heading within a predetermined angle range, and searches for the heading in such a way as to assume, as the heading of the vehicle, the heading at a time when the difference between the waveform acquired through this calculation and the waveform (refer to the "measurement value" of FIG. 5) acquired through the measurement is equal to or smaller than a specified value, and calculates the amount of travel of the vehicle from the velocity and heading of the vehicle to estimate the position of the vehicle which it determined in the previous positioning process. Unless the navigation equipment can calculate the position of the vehicle in the next step ST20, the navigation equipment outputs the position estimated in this step ST32 as the position of the vehicle in the current positioning process.

In the first calculation in the positioning process which the navigation equipment performs periodically, when calculating the velocity vector of the vehicle, the navigation equipment changes the heading within a large angle range including the heading of the vehicle determined in the previous prediction processing and then converts the velocity (scalar) measured by the velocity sensor 21 and the user velocity measuring unit 22 into the velocity vector. At this time, as the navigation equipment advances the convergence calculation, the navigation equipment gradually narrows the angle range including the heading of the vehicle acquired in step ST33. When the requirements in step ST18 are not satisfied and the heading of the vehicle is not calculated in step ST33, the navigation equipment keeps the angle range large. When then, in this step ST32, having searched for the heading, the navigation equipment compares this heading with the heading of the vehicle. When the difference between them is equal to or larger than a predetermined angle, the navigation equipment determines that the heading of the vehicle has a large error, and then corrects the heading of the vehicle with reference to the heading which it has searched for, as shown in FIG. 7.

As previously explained, the navigation equipment in accordance with Embodiment 2 of the present invention measures the velocity of the vehicle on the basis of the pulse signal sent thereto from the velocity sensor 21. Therefore, the navigation equipment can always determine the velocity of the vehicle accurately. Furthermore, because the navigation equipment uses this high-accuracy velocity when searching for the heading of the vehicle at a time of having acquired the range rate without any influence of multipath propagation, the navigation equipment can determine the heading of the vehicle accurately.

As a result, when, for example, the field of vision over the vehicle becomes narrowed because of buildings when the vehicle is traveling along a road in an urban area and therefore the number of GPS satellites which can be used for the positioning is reduced to one or two, or when having still received only one or two GPS satellite radio waves after powered on, a conventional navigation equipment cannot carry out the GPS positioning and therefore stops update of the position and heading of the vehicle. In contrast, the navigation equipment in accordance with this Embodiment 2 can detect the heading of the vehicle by only receiving the range rate without any influence of multipath propagation from one GPS satellite. Therefore, the navigation equipment in accordance with this Embodiment 2 can estimate the position of the vehicle on the basis of the velocity and heading of the vehicle, thereby improving its availability.

Embodiment 3

FIG. 11 is a block diagram showing the structure of navigation equipment in accordance with Embodiment 3 of the present invention, focusing on a portion required for positioning. The navigation equipment in accordance with this Embodiment 3 is changed from the navigation equipment in accordance with Embodiment 2 in such a way that a user velocity and heading observing unit 16 is removed and an angular velocity sensor 23, a user turning angle measuring unit 24, and a user behavior measuring unit 25 are added, and the functions of a user position observing unit 15 and a user heading searching unit 17 are changed, and is also constructed in such a way that the output of a user velocity measuring unit 22 is sent to the user behavior measuring unit 25 instead of being sent to the user velocity and heading observing unit 16. Hereafter, the same components as those of the navigation equipment in accordance with Embodiment 2 are designated by the reference numerals used in Embodiment 2 respectively, and the explanation of the components will be omitted hereafter and only different components will be explained hereafter.

The angular velocity sensor 23 outputs a signal according to the turning angular velocity of the vehicle. The signal outputted from this angular velocity sensor 23 is sent to the user turning angle measuring unit 24. The user turning angle measuring unit 24 measures the turning angle of the vehicle from the signal sent thereto from the angular velocity sensor 23. The turning angle of the vehicle measured by this user turning angle measuring unit 24 is informed to the user behavior measuring unit 25.

The user behavior measuring unit 25 performs dead reckoning calculation by using the velocity informed thereto from the user velocity measuring unit 22 and the turning angle informed thereto from the user turning angle measuring unit 24 so as to update the position, velocity, and heading of the vehicle.

While the user position observing unit 15 observes the position of the vehicle by using GPS satellite radio waves, like the navigation equipment in accordance with Embodiment 1, the navigation equipment in accordance with this Embodiment 3 corrects the position of the vehicle measured by the user behavior measuring unit 15.

Furthermore, while the user heading searching unit 17 analyzes the range rate and then searches for the heading of the vehicle, the user heading searching unit uses the results calculated by the user behavior measuring unit 25 as the position, heading, and velocity of the vehicle, and also uses a predetermined angle range including the heading calculated by the user behavior measuring unit 25 as an angle range within which the user heading searching unit changes the heading.

Next, the operation of the navigation equipment in accordance with Embodiment 3 of the present invention which is constructed as mentioned above will be explained with reference to a flow chart shown in FIG. 12, focusing on a positioning process. The steps in which the same processes as those carried out by the navigation equipment in accordance with Embodiment 2 shown in the flow chart of FIG. 10 are performed are designated by the same reference characters as those used in FIG. 10 respectively, and the explanation of the steps will be simplified hereafter and steps in which different processes are carried out will be explained mainly.

In the positioning process, the navigation equipment calculates the velocity (scalar) of the vehicle first (step ST31). The navigation equipment then calculates the turning angle (scalar) of the vehicle (step ST41). More specifically, the user turning angle measuring unit 24 measures the turning angle of the vehicle from the signal sent thereto from the angular velocity sensor 23. The navigation equipment then calculates the position (vector) of the vehicle (step ST42). More specifically, the user behavior measuring unit 25 performs dead reckoning calculation by using the velocity informed thereto from the user velocity measuring unit 22, and the turning angle informed thereto from the user turning angle measuring unit 24 so as to determine the position, heading, and velocity of the vehicle.

The navigation equipment then checks to see whether or not it is performing GPS reception (step ST11). When the navigation equipment, in this step ST11, determines that it is not performing GPS reception, the navigation equipment ends the positioning process. In contrast, when the navigation equipment, in step ST11, determines that it is performing GPS reception, the navigation equipment calculates the behavior (the position and velocity) of each of the GPS satellites (step ST12). The navigation equipment then calculates pseudo range errors (a GPS-satellite-mounted clock error and a radio wave atmosphere propagation delay error) (step ST13). The navigation equipment further estimates a pseudo range error (a multipath error) (step ST14). The navigation equipment then calculates an error variance of the pseudo range (step ST15). The navigation equipment then checks to see whether the pseudo range error is smaller than a specified value (step ST16). When, in this step ST16, determining that the pseudo range error is smaller than the specified value, the user navigation equipment determines that it can search for the heading of the vehicle, and then advances the sequence to step ST43. In contrast, when, in this step ST16, determining that the pseudo range error is equal to or larger than the specified value, the navigation equipment determines that it cannot search for the heading of the vehicle, and then advances the sequence to step ST18.

In step ST43, the navigation equipment calculates the heading (scalar) of the vehicle. More specifically, the user heading searching unit 17 calculates the velocity vector of the vehicle and the range rate at a time when the vehicle changes its heading within a predetermined angle range, and searches for the heading in such a way as to assume, as the heading of the vehicle, the heading at a time when the difference between the waveform acquired through this calculation and the waveform (refer to the "measurement value" of FIG. 5) acquired through the measurement is equal to or smaller than a specified value.

When calculating the velocity vector of the vehicle, the navigation equipment changes the heading within a large angle range including the heading of the vehicle which is determined in step ST42 by the user behavior measuring unit 25, and then converts the velocity (scalar) measured by the velocity sensor 21 and the user velocity measuring unit 22 into the velocity vector. At this time, as the navigation equipment advances the convergence calculation for the GPS positioning in steps ST12 to ST21, the navigation equipment gradually narrows the angle range including the heading of the vehicle acquired in step ST42. When, in this step ST43, having searched for the heading, the navigation equipment then compares this heading with the heading of the vehicle acquired in step ST42. When the difference between them is equal to or larger than a predetermined angle, the navigation equipment determines that the heading of the vehicle has a large error, and then corrects the heading of the vehicle with reference to the heading which it has searched for, as shown in FIG. 7.

As explained above, because the navigation equipment in accordance with this Embodiment 3 measures the velocity and turning angle of the vehicle on the basis of the signal sent from the velocity sensor 21 and the signal sent from the angular velocity sensor 23, the navigation equipment can always determine the velocity and turning angle of the vehicle with a high accuracy. Furthermore, because the navigation equipment uses this high-accuracy velocity when searching for the heading of the vehicle at a time of having acquired the range rate without any influence of multipath propagation, the navigation equipment can determine the heading of the vehicle accurately. Because the navigation equipment can correct the heading of the vehicle properly even when the vehicle is travelling in an urban area, the navigation equipment stabilizes the accuracy of the heading measurement using dead reckoning. Furthermore, because the navigation equipment properly corrects the position of the vehicle (dead reckoning) which it has determined by using the user behavior measuring unit 25 with reference to the position which it determined with the GPS positioning when the influence of multipath propagation was small, the navigation equipment reduces the accumulation of errors which is a drawback of dead reckoning, and also stabilizes the accuracy of the heading measurement using dead reckoning.

Embodiment 4

FIG. 13 is a block diagram showing the structure of navigation equipment in accordance with Embodiment 4 of the present invention, focusing on a portion required for positioning. The navigation equipment in accordance with this Embodiment 4 is constructed in such a way as to additionally include an angular velocity sensor correcting unit 26 in addition to the components of the navigation equipment in accordance with Embodiment 3. Hereafter, the same components as those of the navigation equipment in accordance with Embodiment 3 are designated by the reference numerals used in Embodiment 3 respectively, and the explanation of the components will be omitted hereafter and only different components will be explained hereafter.

The angular velocity sensor correcting unit 26 accepts a heading calculated by a user behavior measuring unit 25 and a heading calculated by a user heading searching unit 17, and corrects a correction parameter (a bias voltage) used at a time of measurement of the turning angle of the vehicle from an output voltage of an angular velocity sensor 23. The correction parameter corrected by this angular velocity sensor good unit 26 is informed, as an offset error, to a user turning angle measuring unit 24. The user turning angle measuring unit 24 measures the turning angle of the vehicle from the signal sent thereto from the angular velocity sensor 23 after correcting the bias voltage by using the offset error informed thereto from the angular velocity sensor correcting unit 26.

Next, the operation of the navigation equipment in accordance with Embodiment 4 of the present invention which is constructed as mentioned above will be explained with reference to a flow chart shown in FIG. 14 and an explanatory drawing shown in FIG. 15 for explaining the correction of the offset error of the angular velocity sensor, focusing on a positioning process. The steps in which the same processes as those carried out by the navigation equipment in accordance with Embodiment 3 shown in the flow chart of FIG. 12 are performed are designated by the same reference characters as those used in FIG. 12 respectively, and the explanation of the steps will be omitted hereafter and steps in which different processes are carried out will be explained mainly.

In the positioning process shown in the flow chart of FIG. 14, a correcting process (step ST51) of correcting the angular velocity sensor is added between steps ST43 and ST18 of the positioning process shown in the flow chart of FIG. 12. In this correcting process of correcting the angular velocity sensor, the user turning angle measuring unit 24 measures the turning angle of the vehicle from the voltage signal sent thereto from the angular velocity sensor 23 after correcting the bias voltage by using the correction parameter informed thereto from the angular velocity sensor correcting unit 26.

For example, when the vehicle is traveling in a straightforward direction (in a traveling direction shown by a dotted line arrow shown in FIG. 15), as shown in FIG. 15, the difference between the heading calculated by the user behavior measuring unit 25 and that calculated by the user heading searching unit 17 becomes the one as shown by dashed lines shown in FIG. 15 if the locus of the position of the vehicle calculated by the user behavior measuring unit 25 (a traveling path shown by a solid line shown in FIG. 15) shows a slight left turn. The navigation equipment analyzes the transition of this heading difference by using, for example, a polynomial approximation curve, and, if it can find a certain tendency in the transition, can detect the error in the bias voltage of the angular velocity sensor 23 from the parameters of the polynomial approximation curve. When detecting the error in this bias voltage, the angular velocity sensor correcting unit 26 informs this error to the user turning angle measuring unit 24. The user turning angle measuring unit 24 corrects the bias voltage by using the error in the bias voltage informed thereto from the angular velocity sensor correcting unit 26, and measures the angular velocity from the output voltage of the angular velocity sensor.

As previously explained, even if a temperature drift occurs in the angular velocity sensor 23, the navigation equipment in accordance with Embodiment 4 of the present invention can detect and correct an error occurring in the bias voltage of the angular velocity sensor 23. Therefore, the user turning angle measuring unit 24 can measure the turning angle accurately. As a result, the navigation equipment can maintain the accuracy of the position and heading of the vehicle which are measured by the user behavior measuring unit 25 (dead reckoning) at a high level.

Embodiment 5

FIG. 16 is a block diagram showing the structure of navigation equipment in accordance with Embodiment 5 of the present invention, focusing on a portion required for positioning and map matching. The navigation equipment in accordance with this Embodiment 4 is constructed in such a way as to additionally include a map data storage unit 31 and a road comparing unit 32 in addition to the components of the navigation equipment in accordance with Embodiment 2. Hereafter, the same components as those of the navigation equipment in accordance with Embodiment 2 are designated by the reference numerals used in Embodiment 2 respectively, and the explanation of the components will be omitted hereafter and only different components will be explained hereafter.

The map data storage unit 31 stores map data about roads in a predetermined area, the map data consisting of linear data and data about road links each shown by coordinate points and so on. The map data stored in this map data storage unit 31 are read by the road comparing unit 32.

The road comparing unit 32 compares the position of the vehicle observed by the user position observing unit 15 and the heading searched for by the user heading searching unit 17 with the position and direction of a road link which the road comparing unit has read from the map data storage unit 31 respectively, sets up a plurality of candidates for the current position of the vehicle on a road link which has been judged to provide a match with the highest reliability or more, and selects one candidate to be displayed from among the plurality of candidates to determine the candidate's position as the position of the vehicle. The road comparing unit 32 also updates the position of each of the candidates on the road link on the basis of both the velocity of the vehicle calculated by the user velocity and heading observing unit and the heading searched for by the user heading searching unit 17, and evaluates each candidate's reliability according to the difference between the heading searched for by the user heading searching unit 17 and that of the road link so as to select, as the position of the user, the position of the candidate providing the highest reliability among all the candidates.

Next, the operation of the navigation equipment in accordance with Embodiment 5 of the present invention constructed as mentioned above will be explained with reference to a flow chart shown in FIG. 17, an explanatory drawing shown in FIG. 18 for showing a heading correction status and a map matching status of the vehicle, and an explanatory drawing shown in FIG. 19 for explaining candidates which are set up for the map matching, focusing on a positioning process. Because the map matching process is explained in Japanese Patent Gazette No. 374,5165, please refer to this patent gazette as needed.

In the positioning process shown in the flow chart of FIG. 17, a map matching process (step ST61) is added next to step ST21 of the positioning process shown in the flow chart of FIG. 10. In this map matching process, when the position of the vehicle is calculated in step ST32 or ST20, the road comparing unit 32 searches through the map data stored in the map data storage unit 31 for road links in a predetermined area whose center is at the position of the vehicle, and searches for a position on the road link which provides the shortest distance (perpendicular distance) between the road link and the position of the vehicle which is equal to or shorter than a specified value, and which provides a match between the heading and the traveling path.

For example, in a case shown in FIG. 18, during a time period from a time t0 when the navigation equipment is powered on to a time t1, the navigation equipment cannot set up any candidate on a road link because it cannot extract any road link which provides a difference between the heading of the vehicle and the direction of the road link which is equal to or less than a specified angle because of occurrence of an error in the heading of the vehicle. However, because the navigation equipment can know the error occurring in the heading of the vehicle when the user heading searching unit 17 detects the heading at the time t1, the navigation equipment carries out affine transformation of the traveling path by defining, as the center, the position of the vehicle at a time immediately after the navigation equipment is powered on so as to correct the position of the vehicle from P1A(t1) to P1B(t2). Immediately after that, the navigation equipment can extract a road link in the vicinity of the position of the vehicle which provides a difference between the heading of the vehicle and the direction of the road link which is equal to or less than the specified angle. Therefore, the navigation equipment can set up candidates on the road link and, after that, can update the position of the vehicle on the road link.

Furthermore, in a case in which two roads branching off from a single road are running in parallel with each other, as shown in FIG. 19, if the navigation equipment can detect the heading of the vehicle at the time t2, the navigation equipment assigns a higher reliability than those assigned to other candidates to a candidate on a road link whose direction is closer to the detected heading to enable the navigation equipment itself to determine the position of the candidate as the position of the vehicle.

As previously explained, the navigation equipment in accordance with Embodiment 5 of the present invention can judge whether or not each of GPS satellite radio waves received thereby is under the influence of multipath propagation and can also detect the heading of the vehicle if it receives one GPS satellite radio wave which is not affected by the influence of multipath propagation. Therefore, the navigation equipment can limit the angle of heading region in which the vehicle is existing with respect to a GPS position error circle, and can perform the map matching without being greatly affected by the influence of the GPS positioning results whose accuracy is reduced due to multipath propagation. As a result, the navigation equipment can stably and smoothly determine the heading and position of the vehicle on a road in an on-screen map. Accordingly, the navigation equipment can perform guidance and so on appropriately.

Furthermore, because the navigation equipment can evaluate the reliability of the heading of each of a plurality of candidates which are set up in the map matching even in a multipath environment if it receives one GPS satellite radio wave which is not affected by the influence of multipath propagation, the navigation equipment can reduce the occurrence of a mismatch to a road link having a different direction.

Embodiment 6

FIG. 20 is a block diagram showing the structure of navigation equipment in accordance with Embodiment 6 of the present invention, focusing on a portion required for positioning and map matching. The navigation equipment in accordance with this Embodiment 6 is constructed in such a way as to additionally include a map data storage unit 31 and a road comparing unit 32 in addition to the components of the navigation equipment in accordance with Embodiment 4. Hereafter, the same components as those of the navigation equipment in accordance with Embodiment 4 are designated by the reference numerals used in Embodiment 4 respectively, and the explanation of the components will be omitted hereafter and only different components will be explained hereafter.

The map data storage unit 31 stores map data about roads in a predetermined area, the map data consisting of linear data and data about road links each shown by coordinate points and so on. The map data stored in this map data storage unit 31 are read by the road comparing unit 32.

The road comparing unit 32 compares the position and heading of the vehicle calculated by a user behavior measuring unit 25 with the position and direction of a road link which the road comparing unit has read from the map data storage unit 31 respectively, sets up a plurality of candidates for the current position of the vehicle on a road link which has been judged to provide a match with the highest reliability or more, and selects one candidate from among the plurality of candidates to determine the candidate's position as the position of the vehicle. The road comparing unit 32 also updates the position of each of the candidates on the road link on the basis of both the velocity of the vehicle calculated by a user velocity measuring unit 22 and the turning angle of the vehicle measured by a user turning angle measuring unit 24, and evaluates each candidate's reliability according to the difference between the heading searched for by a user heading searching unit and that of the road link so as to select, as the position of the user, the position of the candidate providing the highest reliability among all the candidates.

Next, the operation of the navigation equipment in accordance with Embodiment 6 of the present invention constructed as mentioned above will be explained with reference to a flow chart shown in FIG. 21, an explanatory drawing shown in FIG. 19 for explaining candidates which are set up in map matching, and an explanatory drawing shown in FIG. 22 for explaining a heading correction status and a map matching status of the vehicle after the vehicle has crossed a loop bridge, focusing on a positioning process.

In the positioning process shown in the flow chart of FIG. 21, a map matching process (step ST61) is added next to step ST21 of the positioning process shown in the flowchart of FIG. 14. In this map matching process, when the position of the vehicle is calculated in step ST32 or ST20, the road comparing unit 32 searches through the map data stored in the map data storage unit 31 for road links in a predetermined area whose center is at the position of the vehicle, and searches for a position on the road link which provides the shortest distance (perpendicular distance) between the road link and the position of the vehicle which is equal to or shorter than a specified value, and which provides a match between the heading and the traveling path.

For example, in a case in which two roads branching off from a single road are running in parallel with each other, as shown in FIG. 19, when updating the position on a road link on the basis of both the velocity of the vehicle measured by the velocity sensor 21, and the turning angle of the vehicle measured by the angular velocity sensor 23, the navigation equipment typically judges whether to set up a candidate on either only one of the road links of the two roads branching off or each of both the road links. In the case shown in FIG. 19, the navigation equipment sets up a candidate on each of both the road links as a result of taking into consideration an error in the velocity and an error in the turning angle. At this time, if the navigation equipment can detect the heading of the vehicle at a time t2, the navigation equipment assigns a higher reliability than those assigned to other candidates to a candidate on a road link whose direction is closer to the detected heading and determines the position of the candidate as the position of the vehicle.

Furthermore, in a case in which the vehicle advances to a road at a lower altitude after turning around on a loop bridge, as shown in FIG. 22, when the traveled distance measured by the velocity sensor 21 becomes longer than the length of the road link at the time when the vehicle is crossing the loop bridge, a conventional navigation equipment cannot set up any candidate for the position of the vehicle on the road link because it cannot extract a road link in the vicinity of the position of the vehicle which provides a difference between the heading of the vehicle and the direction of the road link which is equal to or less than a specified angle because of occurrence of an error in the heading of the vehicle when the vehicle advances to the road at a lower altitude after passing through the loop bridge. In contrast, when the user heading searching unit 17 detects the heading of the vehicle, because the navigation equipment of this embodiment can detect and correct the error in the heading of the vehicle, the navigation equipment extracts a road link in the vicinity of the position of the vehicle immediately after that, and corrects the position of the vehicle in such a way that the position of the vehicle is on the road.

As previously explained, even when an error occurs in the position of a candidate on a road link due to accumulation of a digitization error in the road link, an error in the sensors, and a rounding error in the calculated value while continuing to update the position of the candidate on the road link by using both the velocity of the vehicle measured by the velocity sensor 21 and the turning angle of the vehicle measured by the angular velocity sensor 23, the navigation equipment in accordance with Embodiment 6 of the present invention knows the correct heading of the vehicle by only receiving the range rate without influence of multipath propagation from one GPS satellite. Therefore, the navigation equipment in accordance with Embodiment 6 of the present invention can correct the position of the candidate on the road link.

Furthermore, the navigation equipment can judge whether or not each of GPS satellite radio waves received thereby is under the influence of multipath propagation and can also detect the heading of the vehicle if it receives one GPS satellite radio wave which is not affected by the influence of multipath propagation. Therefore, the navigation equipment can limit the angle of heading region in which the vehicle is existing with respect to a GPS position error circle, and can perform the map matching smoothly without being greatly affected by the influence of the GPS positioning results whose accuracy is reduced due to multipath propagation.

Furthermore, because the navigation equipment can evaluate the reliability of the heading of each of a plurality of candidates which are set up in the map matching even in a multipath environment if it receives one GPS satellite radio wave which is not affected by the influence of multipath propagation, the navigation equipment can prevent a map mismatch to a road link having a different direction and update the position of the vehicle more smoothly. In addition, because the navigation equipment can reduce the number of candidates by limiting to candidates providing a match to the heading and reduce the load on the map matching process, the navigation equipment can perform the map matching process at shorter time intervals.

Furthermore, because the navigation equipment can limit the heading of the vehicle for which the navigation equipment calculates an estimated value of the range rate within a predetermined angle range including the direction of a road link on which a candidate exists, the processing load on the heading search does not increase even in a case in which there is no multipath influence on all the received GPS satellite radio waves. As a result, the navigation equipment does not have to lower the time intervals at which it carries out the map matching.

In addition, because the navigation equipment can detect the heading of the vehicle if it receives one GPS satellite radio wave which is not affected by the influence of multipath propagation, the navigation equipment can correct the position of the vehicle promptly every time when the vehicle changes its heading in the vicinity of a branch point, an intersection, or a heading change point even though the position of the vehicle on the road link has an error. Furthermore, although there is a case in which a remarkable difference occurs between the distance actually traveled by the vehicle the length of the corresponding road link even when, for example, the vehicle is traveling a single greatly-curved road, the navigation equipment can promptly correct the position of the vehicle to an appropriate position every time when the vehicle changes its heading even in this case.

Embodiment 7

The navigation equipment in accordance with any one of above-mentioned Embodiments 1 to 6 is constructed in such a way as to detect the correct heading of the vehicle after having succeeded in correctly measuring the velocity of the vehicle. In contrast, navigation equipment in accordance with this Embodiment 7 is constructed in such a way as to, when having succeeded in correctly measuring the heading of the vehicle even though the velocity of the vehicle has a large error, correct the velocity of the vehicle in such a way that the velocity of the vehicle shows an appropriate value.

The navigation equipment additionally includes a user velocity searching unit (not illustrated) for, when having succeeded in recognizing that the heading of the vehicle is correct through GPS positioning while, for example, the vehicle is traveling in a straight line, in order to estimate the range rate, comparing an estimated value which the user velocity searching unit has calculated by changing a coefficient, by which the velocity of the vehicle is to be multiplied, within a predetermined range with a received measurement value, and for searching for the coefficient (a scale factor of the velocity sensor 21) at a time when their waveforms match each other. When the user velocity searching unit then detects the scale factor of the velocity sensor 21, the user velocity measuring unit measures the velocity of the vehicle from the pulses of the velocity sensor 21 by using this scale factor.

With this structure, when the error in the heading of the vehicle is small, in order to estimate the range rate, the navigation equipment compares an estimated value which the user velocity searching unit has calculated by changing the coefficient, by which the velocity of the vehicle is to be multiplied, within a predetermined range while keeping the heading constant, with a received measurement value, and corrects the velocity by using the coefficient at a time when the waveforms of the estimated and measurement values match each other. Therefore, even in a case in which the navigation equipment cannot carry out GPS positioning because the number of GPS satellites which can be used for positioning is one or two, the navigation equipment can correct the velocity of the vehicle in such a way that the velocity of the vehicle shows an appropriate value if the navigation equipment can receive one GPS satellite radio wave without any influence of multipath propagation.

Embodiment 8

When receiving a GPS satellite radio wave without any influence of multipath propagation, the navigation equipment in accordance with any one of above-mentioned Embodiments 1 to 6 is constructed in such a way as to use the heading which the navigation equipment has detected by analyzing the range rate to correct the heading of the vehicle or evaluate the reliability of a candidate for map matching. As an alternative, the navigation equipment can be constructed in such a way as to, when receiving a plurality of GPS satellite radio waves without any influence of multipath propagation at the same time and then detecting a plurality of headings, perform a statistical process on the plurality of detected headings and then carry out the above-mentioned processes. According to this structure, the navigation equipment can detect the heading of the vehicle more accurately.

The navigation equipment can also be constructed in such a way as to, even when receiving only one GPS satellite radio wave without any influence of multipath propagation, perform a statistical process on a plurality of detected headings if receiving the plurality of headings at a plurality of points respectively, and then carryout the above-mentioned processes. According to this structure, the navigation equipment can detect the heading of the vehicle more accurately.

INDUSTRIAL APPLICABILITY

As mentioned above, the navigation equipment in accordance with the present invention can judge whether or not each of GPS satellite radio waves received thereby is under the influence of multipath propagation and can also detect the heading of a vehicle if the navigation equipment can receive one GPS satellite radio wave which is not affected by the influence of multipath propagation even in a case in which the navigation equipment cannot carry out GPS positioning because the number of GPS satellites which can be used for positioning is one or two. As a result, the navigation equipment can reduce the influence of multipath propagation without causing any reduction in its availability, and can improve the positioning accuracy. Therefore, the navigation equipment in accordance with the present invention is suitable for use as a vehicle-mounted navigation equipment or the like that carries out positioning and map matching using a GPS receiver and a dead reckoning sensor.

The invention claimed is:

1. Navigation equipment comprising:
   a radio wave receiving unit for receiving radio waves emitted from a plurality of GPS satellites;
   a signal processing unit for identifying the GPS satellites which are emission sources of the radio waves received by said radio wave receiving unit to measure a pseudo range and a range rate of each of these identified GPS satellites, and for extracting a navigation message included in each of said radio waves;
   a GPS satellite behavior estimating unit for calculating a position and a velocity of each of the GPS satellites from the navigation message extracted by said signal processing unit;
   a pseudo range error estimating unit for estimating a pseudo range error on a basis of the pseudo range and the range rate which are measured by said signal processing unit;
   a user position observing unit for calculating a position of the navigation equipment by using the pseudo range measured by said signal processing unit, the position of each of the GPS satellites calculated by said GPS satellite behavior estimating unit, and the pseudo range error estimated by said pseudo range error estimating unit;
   a user velocity and heading observing unit for calculating a velocity of the navigation equipment from the range rate measured by said signal processing unit, the position of each of the GPS satellites calculated by said GPS satellite behavior estimating unit, and the position of the navigation equipment calculated by said user position observing unit; and
   a user heading searching unit for, when a multipath error included in the pseudo range error estimated by said pseudo range error estimating unit is smaller than a specified value, searching for, as a heading of the navigation equipment, a heading whose range rate, which is calculated on a basis of a relative movement of the navigation equipment having the position acquired by said user position observing unit and the velocity acquired by said user velocity and heading observing unit at a time when the navigation equipment changes its heading within a predetermined angle range with respect to a GPS satellite having the position and the velocity estimated by said GPS satellite behavior estimating unit, matches the range rate measured by said signal processing unit.

2. The navigation equipment according to claim 1, characterized in that the navigation equipment includes a velocity sensor for outputting a signal according to the velocity of the navigation equipment, and a user velocity measuring unit for measuring the velocity of the navigation equipment from the signal from said velocity sensor, and the user velocity and heading observing unit calculates the velocity of the navigation equipment on a basis of the velocity measured by said user velocity measuring unit.

3. The navigation equipment according to claim 1, characterized in that the navigation equipment includes a map data storage unit for storing map data about a predetermined area including road links, and a road comparing unit for comparing the position calculated by the user position observing unit and the heading searched for by the user heading searching unit with a position and a direction of a road link stored in said map data storage unit respectively so as to set up candidates for the position of the navigation equipment on a road link where there is a high possibility that the navigation equipment is existing.

4. The navigation equipment according to claim 3, characterized in that a road comparing unit updates a position of each of a plurality of candidates on a road link on a basis of the velocity calculated by the user velocity and heading observing unit and the heading searched for by the user heading searching unit, and evaluates a reliability of each of the candidates according to a difference between the heading searched for by said user heading searching unit and that of the road link so as to select, as the position of the navigation equipment, the position of a candidate providing the highest reliability among all the candidates.

5. Navigation equipment comprising:
a velocity sensor for outputting a signal according to a velocity of the navigation equipment;
a user velocity measuring unit for measuring the velocity of the navigation equipment from the signal from said velocity sensor;
an angular velocity sensor for outputting a signal according to a turning angle of the navigation equipment;
a user turning angle measuring unit for measuring the turning angle of the navigation equipment from the signal from said angular velocity sensor;
a user behavior measuring unit for calculating a position, the velocity, and a heading of the navigation equipment by using the velocity measured by said user velocity measuring unit and the turning angle measured by said user turning angle measuring unit;
a radio wave receiving unit for receiving radio waves emitted from a plurality of GPS satellites;
a signal processing unit for identifying the GPS satellites which are emission sources of the radio waves received by said radio wave receiving unit to measure a pseudo range and a range rate of each of these identified GPS satellites, and for extracting a navigation message included in each of said radio waves;
a GPS satellite behavior estimating unit for calculating a position and a velocity of each of the GPS satellites from the navigation message extracted by said signal processing unit;
a pseudo range error estimating unit for estimating a pseudo range error on a basis of the pseudo range and the range rate which are measured by said signal processing unit;
a user position observing unit for calculating the position of the navigation equipment by using the pseudo range measured by said signal processing unit, the position of each of the GPS satellites calculated by said GPS satellite behavior estimating unit, and the pseudo range error estimated by said pseudo range error estimating unit, and for correcting the position calculated by said user behavior measuring unit; and
a user heading searching unit for, when a multipath error included in the pseudo range error estimated by said pseudo range error estimating unit is smaller than a specified value, searching for, as the heading of the navigation equipment, a heading whose range rate, which is calculated on a basis of a relative movement of the navigation equipment having the position and the velocity calculated by said user behavior measuring unit at a time when the navigation equipment changes its heading within a predetermined angle range with respect to a GPS satellite having the position and the velocity estimated by said GPS satellite behavior estimating unit, matches the range rate measured by said signal processing unit.

6. The navigation equipment according to claim 5, characterized in that said navigation equipment includes an angular velocity sensor correcting unit for determining an offset error in the angular velocity sensor on a basis of the heading calculated by the user behavior measuring unit and the heading searched for by the user heading searching unit, and the user turning angle measuring unit measures the turning angle of the navigation equipment after correcting the signal from the angular velocity sensor according to the offset error informed thereto from said angular velocity sensor correcting unit.

7. The navigation equipment according to claim 6, characterized in that the navigation equipment includes a map data storage unit for storing map data about a predetermined area including road links, and a road comparing unit for comparing the position and the heading calculated by the user behavior measuring unit with a position and a heading of a road link stored in said map data storage unit respectively so as to set up candidates for the position of the navigation equipment on a road link where there is a high possibility that the navigation equipment is existing.

8. The navigation equipment according to claim 7, characterized in that the road comparing unit updates a position of each of the candidates on the road link on a basis of the velocity calculated by the user velocity measuring unit and the turning angle calculated by the user turning angle measuring unit, and evaluates a reliability of each of the candidates according to a difference between the heading searched for by said user heading searching unit and that of the road link so as to select, as the position of the navigation equipment, the position of a candidate providing the highest reliability among all the candidates.

9. The navigation equipment according to claim 1, characterized in that when determining a heading which provides a match between a measurement value and an estimated value of the range rate on a basis of radio waves emitted from a plurality of GPS satellites, the user heading searching unit determines the heading of the navigation equipment on a basis of results of performing a statistical process on a plurality of determined headings.

10. The navigation equipment according to claim 5, characterized in that when determining a heading which provides a match between a measurement value and an estimated value of the range rate on a basis of radio waves emitted from a plurality of GPS satellites, the user heading searching unit determines the heading of the navigation equipment on a basis of results of performing a statistical process on a plurality of determined headings.

11. The navigation equipment according to claim 1, characterized in that when determining a heading which provides a match between a measurement value and an estimated value of the range rate at each of a plurality of points, the user heading searching unit determines the heading of the navigation equipment on a basis of results of performing a statistical process on a plurality of determined headings.

12. The navigation equipment according to claim 5, characterized in that when determining a heading which provides a match between a measurement value and an estimated value of the range rate at each of a plurality of points, the user heading searching unit determines the heading of the navigation equipment on a basis of results of performing a statistical process on a plurality of determined headings.

13. The navigation equipment according to claim 3, characterized in that the user heading searching unit searches for, as the heading of the navigation equipment, a heading which provides a match between a measurement value and an estimated value of the range rate within a predetermined angle range including directions of road links where the plurality of candidates set up by the road comparing unit exist respectively.

14. The navigation equipment according to claim 7, characterized in that the user heading searching unit searches for, as the heading of the navigation equipment, a heading which provides a match between a measurement value and an estimated value of the range rate within a predetermined angle range including directions of road links where the plurality of candidates set up by the road comparing unit exist respectively.

15. The navigation equipment according to claim 3, characterized in that when the candidates set up by the road comparing unit exist in a predetermined area including a branch point, an intersection, or a heading change point of a road link, the road comparing unit corrects the position in such a way that the position is on a road link which is closest to the heading determined by the user heading searching unit.

16. The navigation equipment according to claim 2, characterized in that the navigation equipment further includes a user velocity searching unit for, when the heading of the navigation equipment matches the heading searched for by the user heading searching unit, searching for a coefficient by which the velocity of the navigation equipment is to be multiplied in such a way that a range rate which is calculated on a basis of a relative movement between the navigation equipment and a GPS satellite matches the range rate measured by the signal processing unit, and the user velocity measuring unit multiplies the signal from the velocity sensor by this coefficient and measures the velocity of the navigation equipment.

17. The navigation equipment according to claim 5, characterized in that the navigation equipment further includes a user velocity searching unit for, when the heading of the navigation equipment matches the heading searched for by the user heading searching unit, searching for a coefficient by which the velocity of the navigation equipment is to be multiplied in such a way that a range rate which is calculated on a basis of a relative movement between the navigation equipment and a GPS satellite matches the range rate measured by the signal processing unit, and the user velocity measuring unit multiplies the signal from the velocity sensor by this coefficient and measures the velocity of the navigation equipment.

18. The navigation equipment according to claim 7, characterized in that when the candidates set up by the road comparing unit exist in a predetermined area including a branch point, an intersection, or a heading change point of a road link, the road comparing unit corrects the position in such a way that the position is on a road link which is closest to the heading determined by the user heading searching unit.

* * * * *